US012562021B2

(12) United States Patent
Price et al.

(10) Patent No.: US 12,562,021 B2
(45) Date of Patent: Feb. 24, 2026

(54) VEHICLE TREATMENT ARCH WITH PRESSURE DIFFERENTIAL INDICATION SYSTEM AND TOOL ENGAGEMENT SYSTEM

(71) Applicant: VACUUM TECHNOLOGIES, LLC, Sheridan, WY (US)

(72) Inventors: Clay D. Price, Sheridan, WY (US); James Jolly Harlan, Banner, WY (US); Justin Taylor Heaps, Ranchester, WY (US); John F. Tucker, Sheridan, WY (US); Eldered Tom Tucker, Sheridan, WY (US); Jared Leroy Meacham, Sheridan, WY (US)

(73) Assignee: Vacuum Technologies, LLC, Sheridan, WY (US)

( * ) Notice: Subject to any disclaimer, the term of this patent is extended or adjusted under 35 U.S.C. 154(b) by 889 days.

(21) Appl. No.: 17/725,212

(22) Filed: Apr. 20, 2022

(65) Prior Publication Data

US 2022/0332293 A1 Oct. 20, 2022

Related U.S. Application Data

(60) Provisional application No. 63/177,223, filed on Apr. 20, 2021.

(51) Int. Cl.
*G07F 17/20* (2006.01)
*B60S 3/00* (2006.01)
*A47L 5/38* (2006.01)

(52) U.S. Cl.
CPC .............. *G07F 17/20* (2013.01); *B60S 3/008* (2013.01); *A47L 5/38* (2013.01)

(58) Field of Classification Search
CPC . B60S 3/008; G07F 17/20; A47L 5/38; A47L 9/00; A47L 9/0009; A47L 9/0018; A47L 9/0027; A47L 9/0054; A47L 9/0063; G06Q 10/20; G06Q 20/28; G06Q 20/326
USPC ........................................................ 194/904
See application file for complete search history.

(56) References Cited

U.S. PATENT DOCUMENTS

| | | | | |
|---|---|---|---|---|
| 6,044,954 A | * | 4/2000 | McLaughlin | ........... G07F 17/06 194/904 |
| 8,061,499 B2 | * | 11/2011 | Khairallah | ............... B62H 3/04 340/432 |
| 2005/0262027 A1 | * | 11/2005 | Hutchinson | .......... G06Q 20/401 705/75 |

* cited by examiner

*Primary Examiner* — Jeffrey A Shapiro
(74) *Attorney, Agent, or Firm* — Nyemaster Goode, P.C.

(57) ABSTRACT

A vehicle vacuuming system that includes: a vacuum housing having an air filter, a motor within the interior volume of the vacuum housing wherein the motor supplies air suction power to a vacuum air intake distal from the motor and through a vacuum hose operably engaged with the vacuum housing, and an air outlet proximate the motor; and a pressure notification system chosen from the group consisting of a light, a speaker, a mobile application, and combinations thereof operably connected to a pressure sensing system associated with the vehicle vacuuming system.

20 Claims, 31 Drawing Sheets

SECTION A-A

SECTION A-A

SECTION A-A

SECTION A-A

SECTION A-A

SECTION A-A

SECTION A-A

VEHICLE TREATMENT ARCH WITH PRESSURE DIFFERENTIAL INDICATION SYSTEM AND TOOL ENGAGEMENT SYSTEM

CROSS-REFERENCE TO RELATED APPLICATION

This application claims priority to and the benefit of U.S. Provisional Patent Application Ser. No. 63/177,223, filed Apr. 20, 2021, and entitled "VEHICLE TREATMENT ARCH WITH PRESSURE DIFFERENTIAL INDICATION SYSTEM AND TOOL ENGAGEMENT SYSTEM", the entire contents of which are hereby incorporated by reference.

SUMMARY

One aspect of the present disclosure generally includes a vehicle vacuuming system that includes: a vacuum housing having an air filter, a motor within the interior volume of the vacuum housing wherein the motor supplies air suction power to a vacuum air intake distal from the motor and through a vacuum hose operably engaged with the vacuum housing, and an air outlet proximate the motor; and a pressure notification system chosen from the group consisting of a light, a speaker, a mobile application, and combinations thereof operably connected to a pressure sensing system associated with the vehicle vacuuming system. The pressure sensing system includes: (1) an air pressure sensor that measures an air pressure difference between an air pressure on an air intake side of the air filter and an air pressure on an opposite side of the air filter defining a motor side air pressure wherein the pressure sensor provides an activation signal to the pressure notification systems when the air pressure difference exceeded a predefined level or (2) an air pressure switch that provides an electronic activation signal to the pressure notification system when the air pressure difference exceeds a predefined level of the pressure switch. The predefined level of the air pressure sensor and the predefined level of the pressure switch corresponds to a level where the wear and tear on the motor is past a set threshold of power usage.

Another aspect of the present disclosure is generally directed to a vehicle washing and vacuuming facility that includes: at least one vehicle parking stall located proximate a vehicle washing enclosure, a vehicle vacuuming system located such that a user who parks their vehicle in one of the at least one vehicle parking stall wherein the vehicle vacuuming system is not within a building structure during use and the vehicle vacuuming systems includes: a vacuum housing having an air filter, a motor within the interior volume of the vacuum housing wherein the motor supplies air suction power to a vacuum air intake distal from the motor and through a vacuum hose operably engaged with the vacuum housing, and an air outlet proximate the motor; and a pressure notification system chosen from the group consisting of a light, a speaker, a mobile application, and combinations thereof operably connected to a pressure sensing system associated with the vehicle vacuuming system. The pressure sensing system typically includes: (1) an air pressure sensor that measures an air pressure difference between an air pressure on an air intake side of the air filter and an air pressure on an opposite side of the air filter defining a motor side air pressure wherein the pressure sensor provides an activation signal to the pressure notification systems when the air pressure difference exceeded a predefined level or (2) an air pressure switch that provides an electronic activation signal to the pressure notification system when the air pressure difference exceeds a predefined level of the pressure switch. The predefined level of the air pressure sensor and the predefined level of the pressure switch corresponds to a level where the wear and tear on the motor is past a set threshold of power usage.

Another aspect of the present disclosure is generally directed to a method of notifying a person of the need to replace or clean an air filter in a vehicle vacuuming system that includes the step of providing a visual indication to a user that a pressure difference between an air pressure within a portion of a vehicle vacuuming system housing outside of an air filter and an air pressure within a portion of the vehicle vacuuming system housing on the side of the air filter after air has passed through the air filter has exceeded a set amount. The pressure difference is sensed by an air pressure sensor or an air pressure switch is operably connected to the air pressure within the portion of the vehicle vacuuming system housing and the air pressure within the portion of the vehicle vacuuming system housing on the side of the air filter after air has passed through the air filter.

Yet another aspect of the present disclosure includes a method of notifying a person or a group of people associated with the operation or maintenance of a vehicle vacuuming facility to clean or replace an air filter within each of a plurality of vehicle vacuuming systems when cleaning or replacing the air filter within each of the plurality of vehicle vacuuming systems is needed. The method includes the steps of: providing a plurality of vehicle vacuuming systems each with a notification system associated therewith; and using the notification systems associated with each of the plurality of vehicle vacuuming systems to provide a visual indication associated with one or a plurality of vehicle vacuuming systems to the person or the group of people when a pressure difference between an air pressure within a portion of a vehicle vacuuming system housing outside of an air filter and an air pressure within a portion of the vehicle vacuuming system housing on the side of the air filter after air has passed through the air filter has exceeded a set amount within any one or a set of the plurality of vehicle vacuuming systems. The pressure difference is sensed by an air pressure sensor or an air pressure switch that is operably connected to the air pressure within the portion of the vehicle vacuuming system housing of the plurality of vehicle vacuuming systems and the air pressure within the portion of the vehicle vacuuming system housing on the side of the air filter after air has passed through the air filter.

Another aspect of the present disclosure is generally directed toward a vehicle vacuuming tool/hose locking mechanism having: a housing having an interior surface and interior volume within the housing sized to receive at least a portion of a vacuum tool or a portion of a vacuum hose or both at least a portion of the vacuum tool and at least a portion of a vacuum hose within the interior volume of the housing; and a locking mechanism within the housing. The locking mechanism typically includes: an electrical solenoid operably connected to a piston having a piston cap on the distal end of the piston such that, when energized, the solenoid moves the piston and piston cap from an extended position to a retracted position; and a grappling system that has two grappling members with a first vacuum tool or hose engagement arm and a second vacuum tool or hose engagement arm and a first piston engagement portion on an opposite side of the first vacuum tool engagement arm and a second piston engagement portion on an opposite side of the second vacuum tool engagement arm wherein the first vacuum tool or hose engagement arm and the second vacuum tool or hose engagement arm each comprise a distal end portion having an inwardly projecting tool engagement portion with a curved interior facing distal surface wherein the inwardly projecting tool engagement portion forms a vacuum tool or hose engaging projection that is configured to engage a vacuum tool or hose when in an engaged position and wherein the two grappling members are engaged with and move in a scissoring manner about a pivot pin within the housing when the solenoid is energized and deenergized.

Yet another aspect of the present disclosure is generally directed toward a method of locking an unlocking a vehicle vacuuming system for use by a user. The method typically includes the step of unlocking a locking mechanism holding and retaining a vehicle vacuuming tool and thereby also the vehicle vacuuming hose connected with the tool in a locked configuration and disengaging the locking mechanism and releasing the vehicle vacuuming tool and hose for use by a user. The step of unlocking the locking mechanism typically occurs when an electrically signal is provided to a solenoid of the locking mechanism or other motivating system, which causes a piston to retract and force a first vacuum tool or hose engagement arm and a second vacuum tool or hose engagement arm to separate by moving apart and into a disengaged position from the vehicle vacuuming tool positioned therebetween.

Still another aspect of the present disclosure includes a vehicle vacuuming system for a vehicle vacuum tool having a lower support with a vacuum housing with a vacuum hose extending therefrom. The vacuuming system includes a vacuum tool holder coupled to the lower support and having a holding aperture on an end opposite the lower support leading to an interior volume with an upper portion and a lower portion and a lock tooth extending downwardly from an upper portion of the interior volume, a vacuum tool disposed on an end of the vacuum hose distal from the vacuum housing and having a nose end and a hose end that is attached to the vacuum hose, and a tooth indentation disposed on a top portion of the nose. The lock tooth and the tooth indentation interface such that the vacuum tool cannot slide out of the vacuum tool holder by gravity alone, and the lower portion of the vacuum tool holder is configured to allow the tool to rotate downwardly such that the tooth indentation is removed from interfacing with the lock tooth such that the tool is removable from the vacuum tool holder.

Yet another aspect of the disclosure includes a vehicle vacuuming tool/hose locking mechanism having a housing having an interior surface and interior volume within the housing sized to receive at least a portion of a vacuum tool within the interior volume of the housing and a locking mechanism within the housing. The locking mechanism includes an electrical solenoid operably connected to a piston such that, when energized, the solenoid moves the piston from an extended position to a retracted position, and a locking arm coupled to the piston having an engaging projection that is configured to positively lock a vacuum tool or hose when in the extended position and allow release of the vacuum tool when in the retracted position.

These and other aspects, objects, and features of the present invention will be understood and appreciated by those skilled in the art upon studying the following specification, claims, and appended drawings.

DETAILED DESCRIPTION

Figure 2:
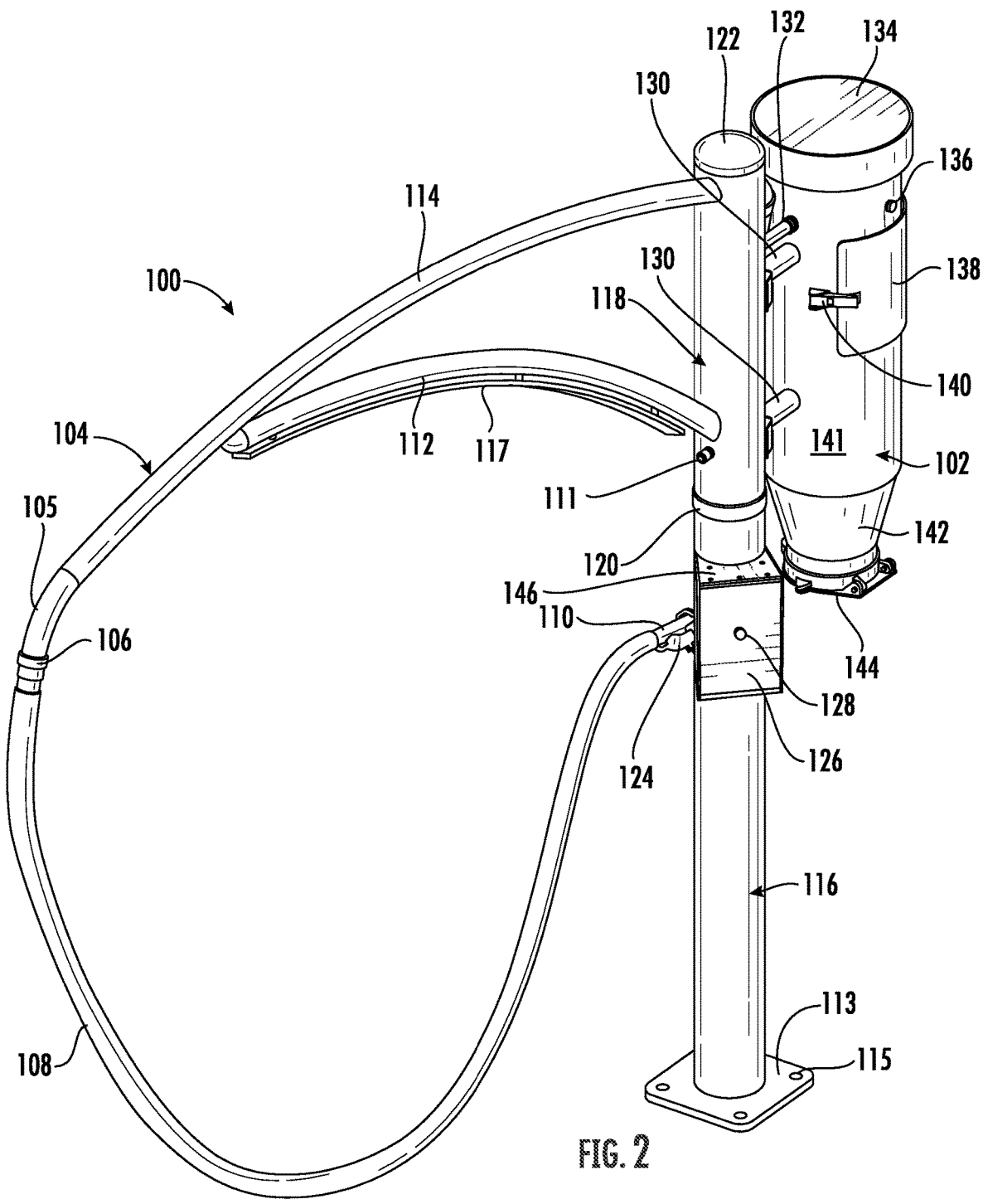
FIG. 2 is a perspective view of a single vehicle vacuuming system according to an aspect of the present disclosure.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure generally relates to a vehicle vacuuming system 100. The vehicle vacuuming systems 100 of the present disclosure are typically a component of an overall vehicle washing facility 10 (FIG. 1) that may employ one or a plurality of vehicle vacuuming systems. Of course, one or more vehicle vacuuming systems according to the present disclosure may be used independently from a vehicle washing system too. A vehicle vacuuming system 100 is typically positioned such that each vehicle vacuuming system is associated with a single side of a vehicle parking stall 12. The vehicle vacuuming systems 100 positioning can conceivably be at any location convenient to a user to vacuum the interior of a vehicle. There may be at least one vehicle vacuuming system 100 for each vehicle parking stall 12, but typically there are exactly two vehicle vacuuming systems associated with each vehicle parking stall 12, one on each side of the vehicle to allow each side of the vehicle to be easily vacuumed without the hose making substantial or ideally any contact with the exterior surface of the vehicle that might damage or scrape the exterior surface of the vehicle.

Figure 1:
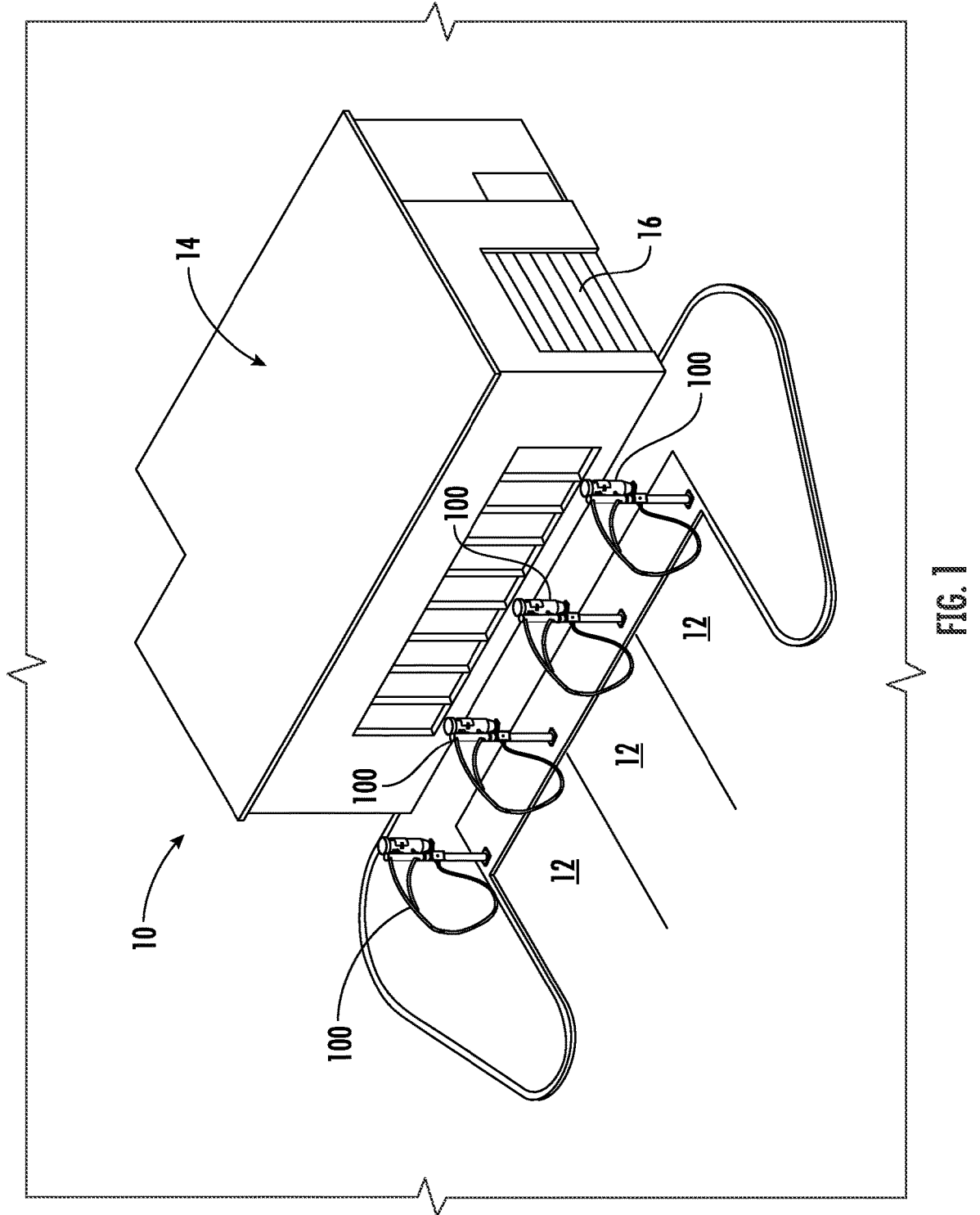
FIG. 1 is a perspective view of an exemplary vehicle washing facility according to an aspect of the present invention incorporating a plurality of vehicle vacuuming systems.

As shown in FIG. 1, the vehicle vacuuming systems 100 are typically positioned proximate both the vehicle parking stalls 12 and the vehicle washing building enclosure 14. When a vehicle is to be washed, the vehicle approaches the vehicle washing building enclosure's entrance 16, is washed within the enclosure either stationary or using a moving track system to draw the vehicle through the washing system(s) and thereafter the vehicle exits the enclosure's exit (not shown). Thereafter, the vehicle owner or operator may position the vehicle with the now cleaned exterior in a vehicle parking stall 12 and use the vehicle vacuuming systems 100 to clean the interior of the vehicle as discussed above.

As shown in FIG. 2, the vehicle vacuuming system 100 is typically composed of a variety of different sub-assemblies. The vehicle vacuuming system 100 typically includes a vacuum canister system 102, a vacuum extension assembly 104, a lower support 116 and an upper support 118. In some embodiments a single upright support may be used instead of separate lower and upper supports. The lower support 116 is typically engaged with the upper support 118 and a collar 120 is typically positioned at and over the joint where the lower support 116 and upper support 118 meet. The collar is typically primarily used to provide a water tight seal to keep water out of the interior of the overall support system at the jointing location of the lower support and the upper support. As shown in FIG. 2, the lower support may be anchored to a cementitious or other hard vehicle tolerant surface or the ground, typically via a cement anchoring bracket similar to those used to anchor outdoor basketball hoops in the ground. The lower support typically engages the surface it is mounted to using a base plate 113, which is typically integral or welded to the lower support 116. The base plate 113 typically has anchoring apertures 115 that fit over the threaded ends of an anchoring bracket positioned within the ground or cementitious material who's threaded portions extend through the anchoring apertures 115 and receive a nut to tighten the lower support into engagement with the anchoring system embedded in the cement, blacktop or similar material within the ground or on the surface of the ground or surface coated material.

The vacuum extension assembly 104 typically includes a long arm 114 and a support arm 112 extending away from the upper support 118 and affixed thereto. While the location is not necessarily critical, the support arm 112 typically engages the long arm 114 at a point at least about 70 percent of the length of the long arm away from the upper support 118. This allows for a downwardly projecting light, which is typically an array of light emitting diodes or similar light bar 117 that illuminate the vehicle parking stall area 12 proximate the side of the vehicle being treated, which helps a user better see within the interior of the vehicle during use. The long arm 114 of the vacuum extension assembly 104 typically has a downward end segment 105 engaged to the end of the long arm 114 distal from the upper support 118. The long arm 114 and the end segment 105 are typically constructed of hollow rigid material of sufficient strength to carry vacuum pressure therethrough and to the vacuum canister system 102. The coupling 106 provides an air tight seal to prevent any or at least a significant loss of vacuum pressure from the hose 108 to the end segment 105 and ultimately to the long arm 114.

The hose 108 is typically constructed of any hollow elastomeric material used to construct vacuum hose 108. The vacuum hose 108 may be produced from plastic, polyvinylchloride piping, a polyolefin polymer, rubber, or other material that is typically crush-proof while having a durable and light-weight design. Additionally, the hose 108 may be UV resistant to prevent rapid deterioration or other defects caused by use in an outdoor environment. The hose 108 can be utilized in a wide range of colors as well. The hose typically has a diameter from about 1 inch to about 2 inches and a length from about 15 to 50 feet. The hose 108, as discussed above is typically flexible and crush resistant. The hose 108 typically has a bend radius of from about three (3) inches to four and one half (4.5) inches and may be used as long as the temperature is above about −40° F. At the end of the hose 108 opposite the coupling 106 is a vacuum tool 110. The vacuum tool is typically a crevice tool but can be any type of vacuum tool and may be simply a round inflexible plastic or metal end segment. When not in use, the vacuum tool 110 may be seated within the vacuum tool holder 124 that is typically affixed to the lower support 116. Typically, one or more lights 117 that are typically configured as a strip or rod are mounted to the underside of the support arm 112. The lights 117 are typically LED lights as discussed above and are typically in the form of a strip or bar fixedly mounted to the support arm 112. Power for the LED lighting system is typically routed from inside the upper support 118 through the cord grip sealing electrical connection 111, which is typically positioned opposite the lower canister support 130. The cord grip seal electrical connection provides a location to wrap excess cord length that is not needed to reach the end of the LED light strip 117 and also provide a water tight seal to the interior of the upper support 118. Power for the LED lighting is typically provided from an electrical source routed through the lower support 116 and the upper support 118.

The upper support 118 and the lower support 116 are typically hollow. As such, the top of the upper support 118 has a support cap 122 affixed over it to prevent water, rain, snow and/or ice or dust and other particulates from readily entering into the interior of the upper support 118.

The vehicle vacuuming systems 100 of the present disclosure further typically include a control box 126. The control box shown in FIG. 2 is a basic control box having a single activation button 128. However, the control box may be significantly more complicated and have greater functionalities than simply turning on and off the system. For example, the control box may be adapted to accept coins, bills, credit cards and mobile payment systems and methods such as APPLE PAY® and GOOGLE PAY® or other digital wallet online payment system. The digital payment systems replace a credit card or debit card chip and PIN transaction used with a typical contactless capable point of sale terminal. These systems typically have a two-factor authentication via finger print identification, face print identification, personal identification number, and/or passcode. The phone or other mobile wallet enabled device wirelessly communicates with the point of sale system (control box 126) using near field communication (NFC) with an embedded secure element (eSE) to securely store payment data and perform cryptographic functions and biometric authentication.

Figure 3:
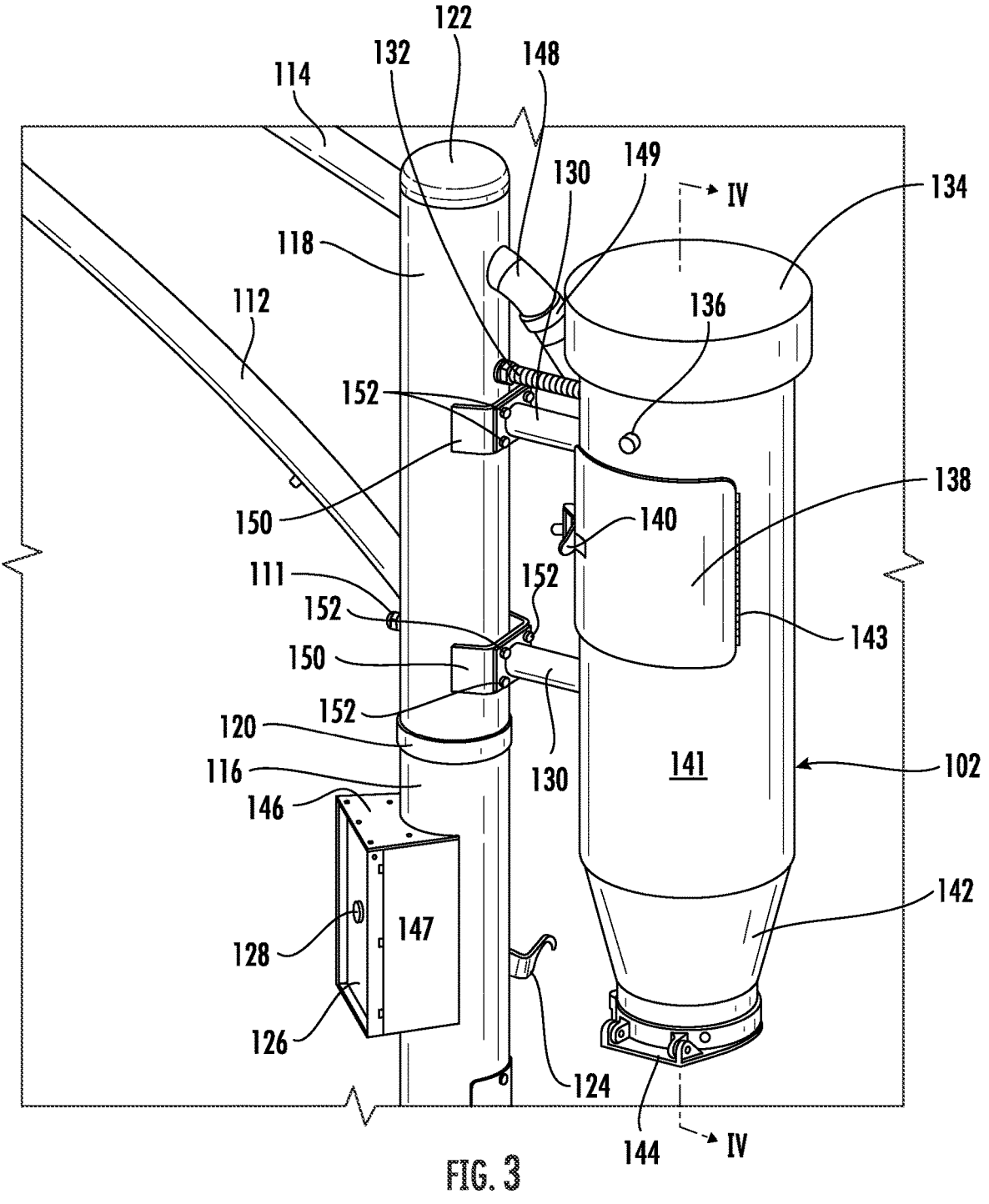
FIG. 3 is a perspective view of the upper portion of a vehicle vacuuming assembly according to an aspect of the present disclosure.
Figure 4:
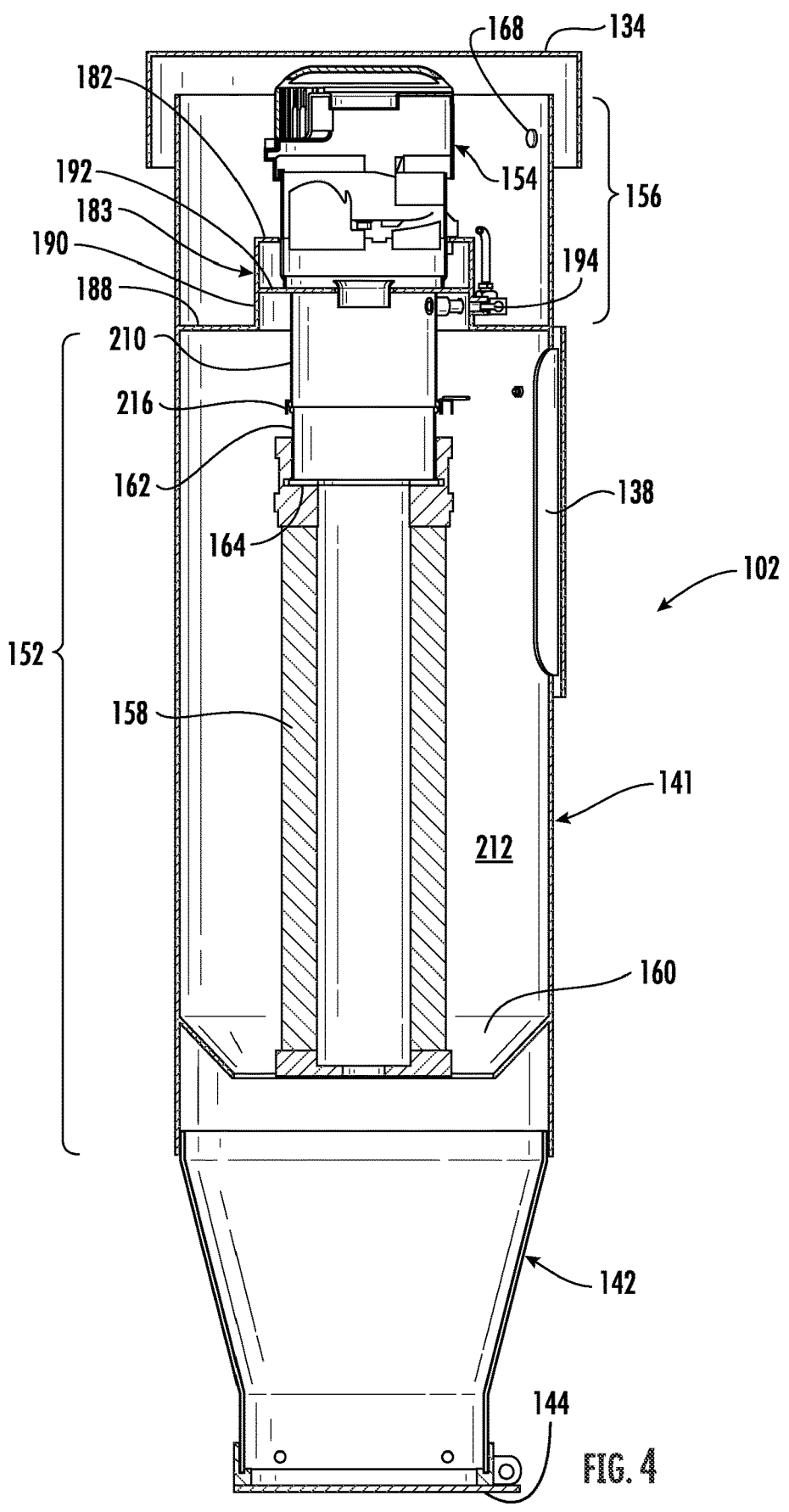
FIG. 4 is a cross-sectional view of a vacuum canister system taken along lines IV-IV in FIG. 3 according to an aspect of the present disclosure.
Figure 5:
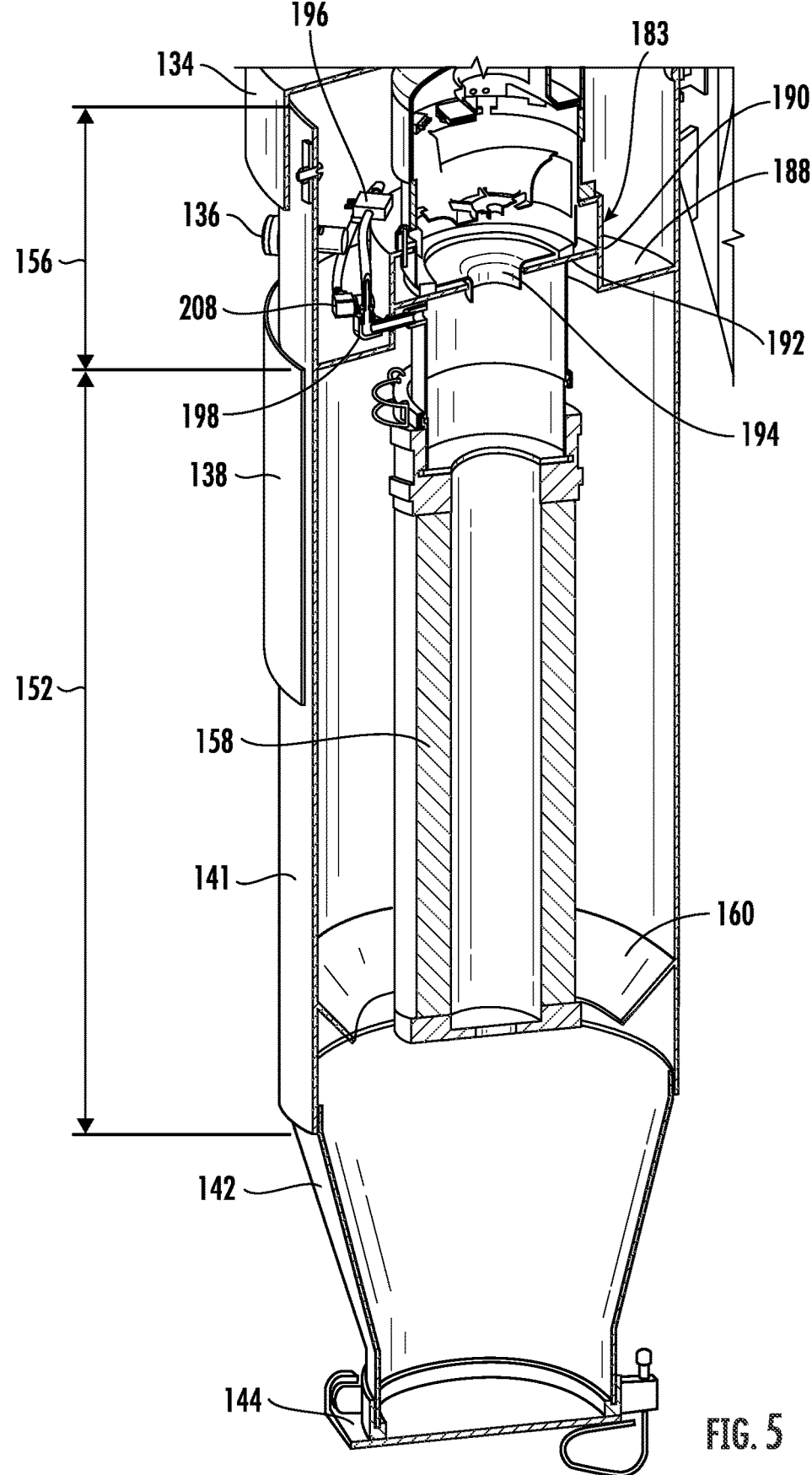
FIG. 5 is a cross-sectional view of a vacuum canister system according to an aspect of the present disclosure.

As shown in FIGS. 2 and 3, the vacuum canister system 102 is connected to the upper support 118 by a plurality of supports 130. The cylindrical supports 130 are typically hollow and welded to the cylindrical portion 141 of the vacuum canister system 102. The opposite end of the supports 130 are typically engaged with the upper support 118 using a welded substantially C-shaped bracket 150 affixed to the upper support 118 using bolts 152 or other fasteners. The substantially C-shaped brackets typically have a left and right planar portion and a planar center body portion. The planar center body portion typically has four brackets proximate each corner of the rectangular center section.

As shown in FIG. 3, the control box 126 typically includes a cap 146 configured to cover the top of the control box and matingly engage the lower support 116. The sides 147 of the control box typically extend around at least a portion of the lower support 116. The front of the control box may have a lockable door portion to access the interior of the compartment or the top may be lockingly and removably engaged and disengaged from the box housing and allow access to the interior of the control box for repair, maintenance or management of payments. The control box may be optionally water tight or otherwise sealed to prevent water or other elements from penetrating into the interior volume of the control box when it is closed thereby preventing any damage or at least any substantial damage to the components inside the control box that may result from environmental conditions such as rain, snow and wind.

Electrical power is typically supplied to the motor of the vacuum canister system 102 through the upper and lower supports and via the flexible conduit 132. Additionally, the start/stop function instructions provided by the control box 126 upon activation of the button 128 or payment of the fee are provided via wiring that carries signals and is run from the control box through the lower support 116, upper support 118 and the flexible conduit 132 to the motor within the vacuum canister system 102.

The air pulled into the system is provided from the long arm 114 via the 45-degree elbow 148, which is typically constructed of a plastic, such as polyvinylchloride, or metal piping, which is engaged via a coupler 149, which engages piping that supplies air in to the vacuum canister system 102.

The vacuum canister system 102, as discussed previously, typically includes a cap 134, a replacement filter indicator light 136, a filter access door 138, which is typically connected to the cylindrical portion of the canister 141 by a piano hinge 143, which is sealed in a closed position using latch system 140. The cylindrical portion of the canister 141 connects to a bottom cone-shaped funnel portion 142, which has an outlet covered by a hinged dump valve 144. The hinged dump valve 144 is typically one that can be opened by hand and without the use of tools, more typically one that can be opened by a single hand and without the use of tools such as the one disclosed in U.S. patent application Ser. No. 16/869,256, the entire disclosure of which is hereby incorporated by reference.

The various internal components of the vacuum canister system 102 are shown in FIGS. 4-13. As shown in FIGS. 4-13, the vacuum canister system typically employs a motor, which is typically a brushless direct current motor 154 within a top motor-containing portion 156. The top motor-containing portion 156 is typically the top one quarter to one third of the overall vacuum canister system 102. The top motor-containing portion 156 is covered by a rain cap 134. The rain cap 134 is removably positioned over the top motor-containing portion. As shown in greater detail in FIGS. 6-9, the rain cap 134 may be held in place by radially extending bolts or other fasteners 168. The head of the radially extending bolt 168 is typically positioned within the top interior portion of the cylindrical canister 141 and extends therethrough such that the treaded portion extends through an L-shaped bracket 174 welded or otherwise affixed to the interior cylindrical surface of the rain cap 134. The L-shaped bracket 174 typically has an extension portion 175 having one end typically welded or otherwise permanently affixed to the interior surface of the rain cap 134 and the other end extending to a curved middle section of the L-shaped bracket. The extension portion 175 is typically a length sufficient to space the cap away from the cylinder 141 with enough space to allow a person to access the nut 170 of the nut and bolt retaining the cap over the cylinder. This distance is typically from about one and a half to about two and a half inches. The L-shaped bracket 174 further includes a cap engagement portion extending from the curved center portion that has an L-shaped groove 176 defined by an L-shaped bracket leg 178 and a L-shaped bracket main body 180. The L-shaped bracket leg 178 typically has less width than the L-shaped bracket main body portion. The canister 141 typically has a plurality, more typically three or four apertures proximate the top of the canister through each of which a bolt 168 is positioned. The bolts 168 may be permanently welded to the cylinder or removably engaged thereto. Once the bolts 168 are in position extending through to the outside circumference of the cylinder, the cap 134 with a corresponding number of L-shaped brackets 174 affixed thereto is positioned thereon and rotated such that the bolt slides within the L-shaped groove 176 and the cap further seats downward. Once positioned, the cap is tightened into frictional engagement with the cylinder 141 using a wrench, socket, or other too to tighten the nut into engagement with the bolt. Conceivably, the nut 170 and washer 172 may be tightened to finger tightness, but slightly more force is typically recommended for a secure connection. As discussed above, the space between the interior surface of the cap 134 and the outer surface of the canister 141 is typically sufficient to reach a wrench or socket tool therein to tighten and loosen the nuts 170 to engage and disengage the cap. The rain cap 134 typically extends down and over a portion of the cylinder sufficient to prevent any moisture from rain or snow or blowing debris from entering the interior of the canister 141. The top of the cap 134 may abut the top perimeter of the canister 141 or extend there above. The removability of the cap provides easy access to the motor 154 to allow easier maintenance or replacement of the motor and other mechanical parts of the overall system without the entire vacuum canister system 102 having to be removed from the overall vehicle vacuuming system 100. The vacuum canister system 102 may remain mounted to the upper support 118 during most, if not all, maintenance of the motor.

The motor 154 is typically seated on a motor engaging planar flange 182 of an interior scaffolding 183. The interior scaffolding 183 is affixed to the interior surface of the canister 141 and generally defines and separates the top motor-containing portion 156 and the bottom filter-containing portion 152 of canister 141. The interior scaffold 183 typically includes a radially inwardly projecting base portion 188, which projects from the interior surface of the canister toward the center of the interior volume of the canister 141, an upwardly extending side portion 190, which is typically cylindrically shaped but could be a multisided surface composed of a plurality of walls instead of a single cylindrical wall, a filter mounting tube plate 192 extending inwardly from a generally center portion of the upwardly extending side 190, and the motor engaging planar flange 182 at the top of the upwardly extending side 190. The top surface of mounting tube plate 192 may have a gasket 186 or other air tight sealing material placed thereon such that when the bottom surface of the motor is engaged therewith air does not flow around the motor inlet 194.

As discussed above, the motor 154 is typically a brushless direct current (DC) motor having variable revolutions per minute up to about 18000 revolutions per minute. The motor can variably increase the revolutions per minute to provide constant vacuum pressure and therefore performance for the customer despite increased resistance due to potential buildup of debris in the air filter 158. The motor 154 draws a constant amp load and may operate on both 120 and 240 voltages. The brushless direct current motor typically used is one produced by AMETEK® of Berwyn, PA. All of the electronics of the entire vacuum canister system 102 are able to run off 120-volt or 240-volt power sources. The lighting of the overall vehicle vacuuming system 100 also typically can run off either 120-volt or 240-volt power.

In order to prevent significant deterioration and premature failure of the motor 154, the pleated air filter 158 typically should be changed and/or cleaned on a regular basis. Given that the motor 154 of the present disclosure is a variable speed motor, the wear and tear on and the energy expended by the motor 154 may not be readily apparent simply by use of the vehicle vacuuming system 100 since the system is designed to use increased revolutions per minute in the face of additional resistance to air flow to provide consistent performance to the user of the system. In order to prompt someone, typically the facility owner or maintenance staff to replace or clean the pleated air filter 158, the vacuum canister system 102 typically employs a notification system. The notification system may take many forms. Typically, the notification system will employ a pressure switch 196 that constantly receives air pressure readings from both the filter side and the motor side air within the vacuum canister system. The pressure switch 196 typically has a filter side air pressure inlet 197 and a motor side air pressure inlet 199. Each of these inlets has couplings with radially extending ribs to create an air tight seal when plastic flexible tubing is pushed onto the inlet coupling by hand and without the use of tools. The coupling employed to engage the tubing to the inlets 197, 199 are typically male connectors that receive hollow tubing thereon.

The pressure switch is typically fixedly engaged via one more screw 201 or other fastener or an adhesive to the motor engaging planar flange 182. Tubing 206 connects the air inlets of the air inlets 197, 199 of the pressure switch 196 with male connector air outlets 200 of a motor-side brass fitting 198 and an air filter side brass fitting 208. The motor-side brass fitting 198 threadably engages the male connector air outlet 200 and one of the threaded end portions 203 of the threaded connector 202. The other end of the threaded connector 202 engages the threaded female attachment fitting 204, which attaches to and provides motor-side air to the pressure switch from within the interior volume of the motor inlet engaging pipe 210. The threaded female attachment fitting 204 may be integrally formed and welded to the motor inlet engaging pipe 210. The connector 202 typically extends the connection of the fitting to the motor-side air pressure through the filter side air pressure space 212. Similarly, the male connector air outlet 200 of the air filter side brass fitting 208 is threadably engaged with the air filter side brass fitting. The connector 200 provides the air outlet of the air filter side brass fitting 208. The air inlet of the brass fitting 208 is in engagement with the air filter side air pressures space 212 to supply the air filter side air pressure to the pressure switch 196.

Figure 14:
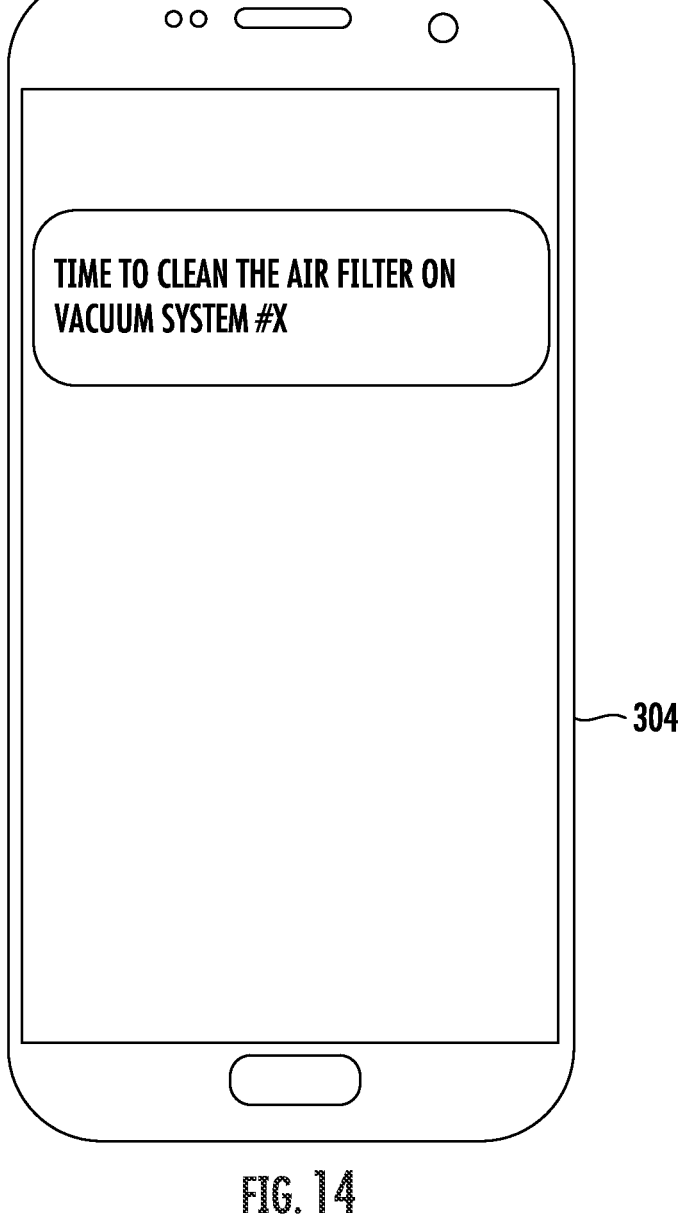
FIG. 14 is an elevated front view of a mobile computing device showing a notification supplied to the mobile computing device via SMS texting or mobile application signal communication where the notification tells an operator or owner affiliated with the vehicle vacuuming system to clean the air filter of at least one of the vehicle vacuuming systems of a vehicle washing system according to an aspect of the present disclosure.

The air pressure switch 196 is typically electrically connected to the indicator light 136 via a wired connection (not shown) using connector tabs 214 which receive electrical push connectors of the wires. Instead of or in addition to a visual indicator 136 on the canister 141, which illuminated and/or flashes after a predetermined pressure difference occurs between the motor side air pressure and the filter side air pressure, an audible indicator could also be employed or employed instead of the visual indicator. Additionally, the systems of the present disclosure may further include a wired or wireless notification system that provides remote notification to an owner, maintenance person or other authorized user of a computer system. The notification may be provided via a wireless internet and/or cellular connection to a mobile computing device. The notification may be an SMS or text message notification or a pop up or other notification supplied by a mobile application on the mobile computing device designed to monitor the status of one or a plurality of vehicle vacuuming systems 100 of an overall vehicle washing facility 10 or the vehicle vacuuming systems 100 and other systems employed throughout the vehicle washing facility 10, such as the condition and status of water used within the vehicle washing facility and/or equipment therein. In this manner, a person would not need to be physically present to know that the pressure difference between the motor-side and filter side of the vacuum canister system is higher than recommended and thus potentially adding additional wear and tear and stress to the motor of the vacuum canister system such that the filter 158 should be cleaned and/or replaced to alleviate the resistance causing the pressure difference between the motor side and the air filter side of the system. As mentioned above, one such notification may be a push notification regardless of whether the user is presently utilizing a mobile application such as that shown in FIG. 14 where the notification both indicates that the air filter needs cleaning and which filter/vacuum canister system of the overall vehicle washing facility needs to be cleaned. In this manner if a vehicle washing facility 10 employs a plurality of vehicle vacuuming systems, the filter on precisely which vehicle vacuuming system that needs cleaning or replaced will be indicated.

Significantly, while shown in connection with an arch system type vehicle vacuuming systems with the vacuum canister suspended on the upper support. The pressure differential switch and notification systems of the present disclosure may also be employed in a more traditional canister kiosk on ground canister vacuuming systems that do not employ an arch of any kind as well. These on ground canister systems have a hose connected directly to them for use by the user and no arch to extend the system above the vehicle. The hose is not elevated, but instead allowed to run along the vehicle traveling surface, typically the concrete of the parking lot of the vehicle washing system or convenience store or gas station.

As shown in FIGS. 6 and 11-13, the pleated filter 158 may be removably engaged and disengaged by hand and without the use of tools using a removable ring clamp 216. The ring clamp 216 typically has an elastomeric gasket 218 spaced within the interior channel 220 of the ring clamp 216. The ring clamp may be opened by the user grabbing the paddle handle 222 and pulling it away from the remaining portion of the ring clamp. The ring clamp is retained in its position using a cotter pin 224 to prevent its accidental disengagement. In use, the ring clamp 216 is positioned over the rolled end 226 of the motor inlet engaging pipe 210 and the rolled end 166 of the filter mounting tube 162. The filter mounting tube 162 has a filter mounting plate 164 that extends a distance within and circumferentially about the exterior of the bottom of the filter mounting tube 162. The clamp 126 fits over both rolled end 226 and rolled end 166 and retained within the interior channel 220 in an air tight friction fit configuration by the clamp when the clamp is in the closed position. The ring clamp 216 can be released and engaged by hand and without the use of tools to easily remove the pleated filter and pleated air filter 158 and filter mounting tube 162 for replacement or such cleaning.

Figure 12:
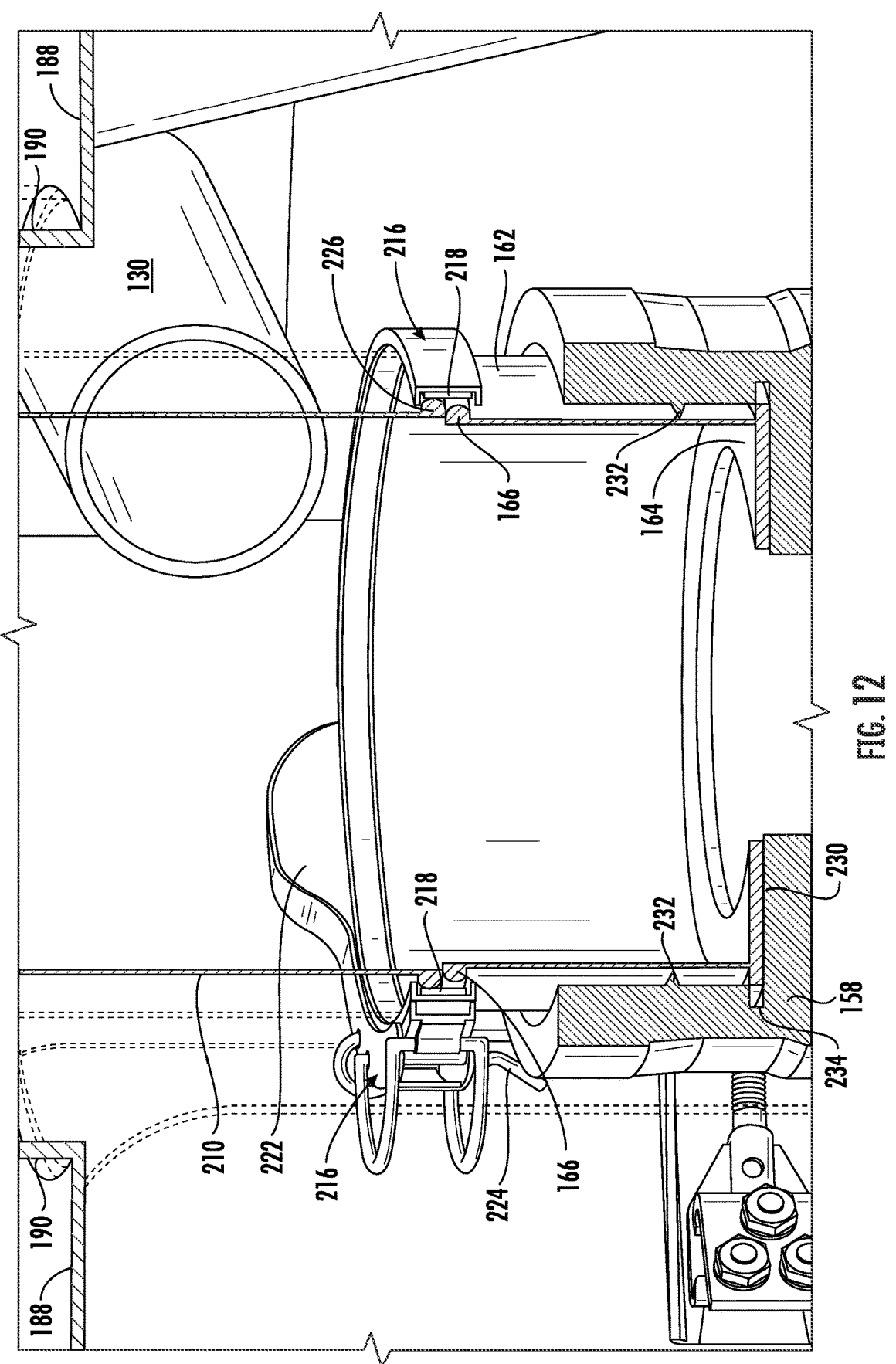
FIG. 12 is a cross-sectional view of the clamping filter engagement system that retains the filter mounting tube in engagement with the motor inlet engaging pipe according to an aspect of the present disclosure.
Figure 13:
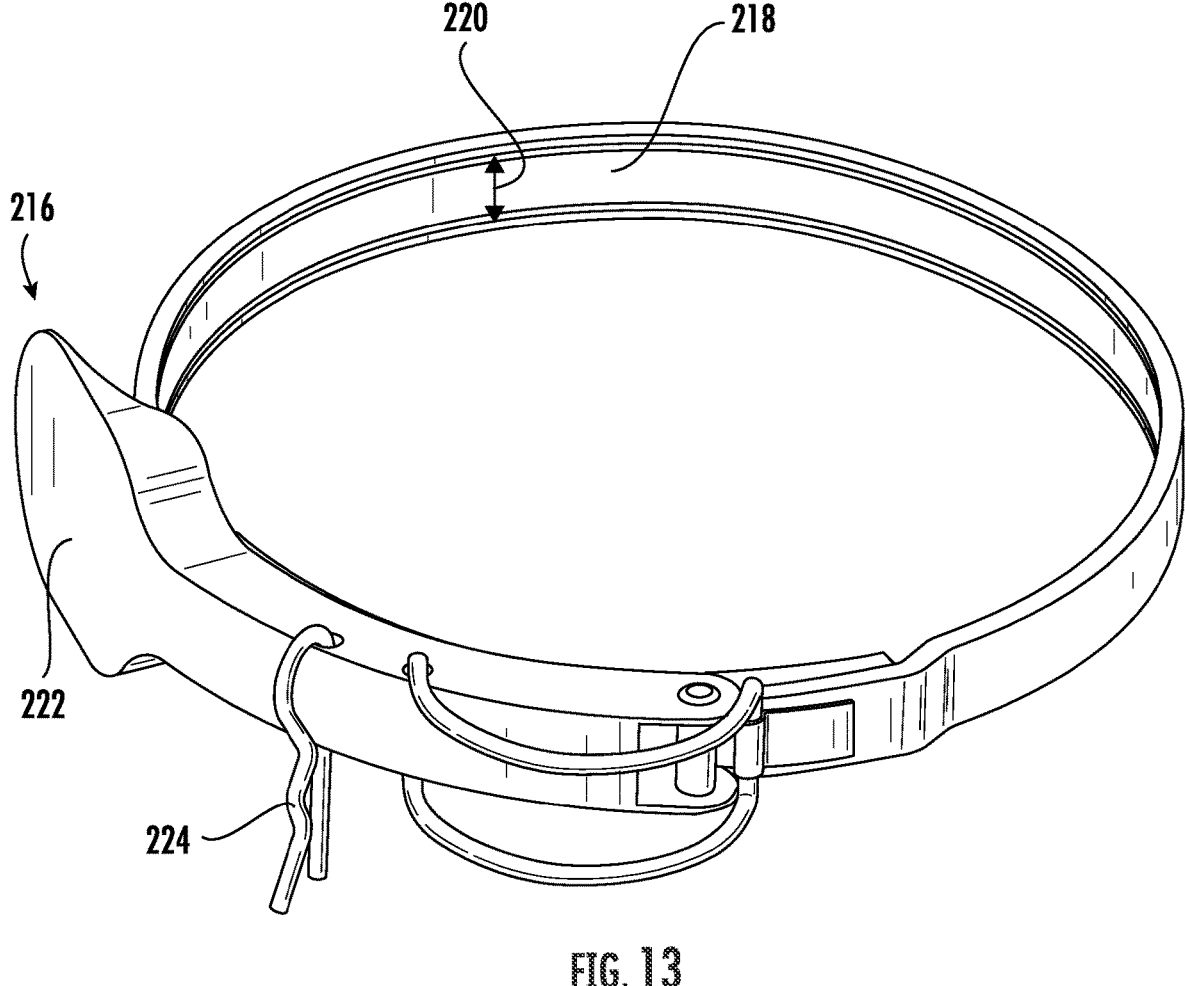
FIG. 13 is a perspective view of a ring clamp used to engage the motor inlet engaging pipe and the filter mounting tube with one another according to an aspect of the present disclosure.

The pleated air filter 158 is typically engaged with the side of the filter mounting tube 162 and the bottom-facing surface 230 of the filter mounting plate 164. An adhesive is typically employed on the bottom surface 230 and at least one inwardly facing projection 232 is circumferentially present around the interior surface of the pleated air filter 158 face that faces the exterior surface of the filter mounting tube 162 as best shown in FIG. 12. While projection 232 is shown as triangular in cross-section in FIG. 12, it should be appreciated that other shaped cross-sections and pluralities of circumferential projections may be employed. Additionally, the filter mounting plate 164 typically has a radially outwardly extending portion 234 that projects into the pleated air filter 158 to further assist in retaining it in its position and creating an air tight seal. The adhesive utilized on the bottom surface 230, the projection or projections 232 and the outwardly projecting portions 234 facilitates creation of an air tight seal as well. The filter mounting tube 162 and motor inlet engaging pipe 210 are typically a metal material, but could conceivably be produced from a durable plastic. Most typically, the tubing is produced from sheet metal.

Figure 6:
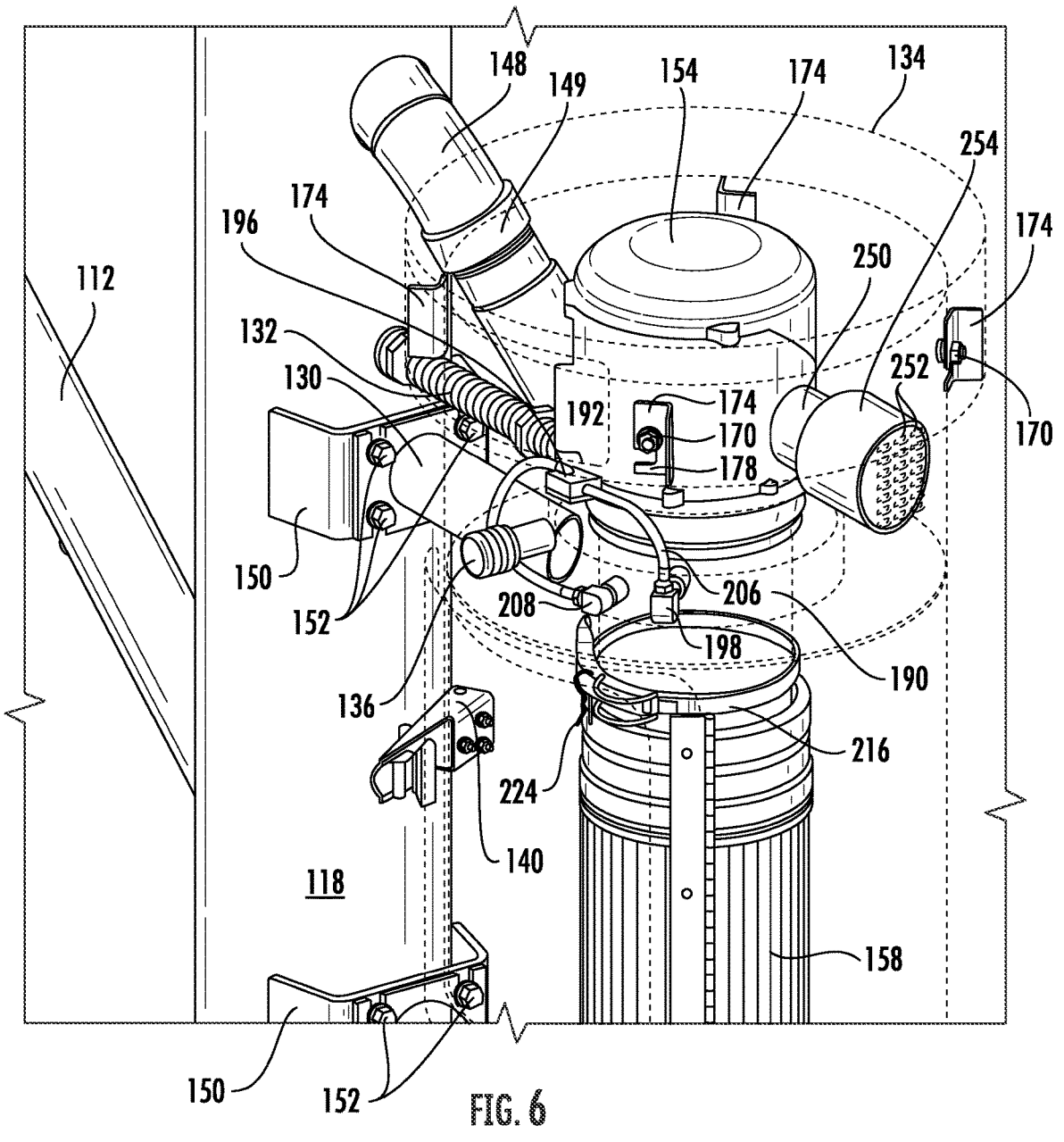
FIG. 6 is an enlarged perspective view of the interior of a vacuum canister system having certain exterior wall elements of the vacuum canister system drawn transparently to allow easier view of the interior components according to an aspect of the present disclosure.
Figure 7:
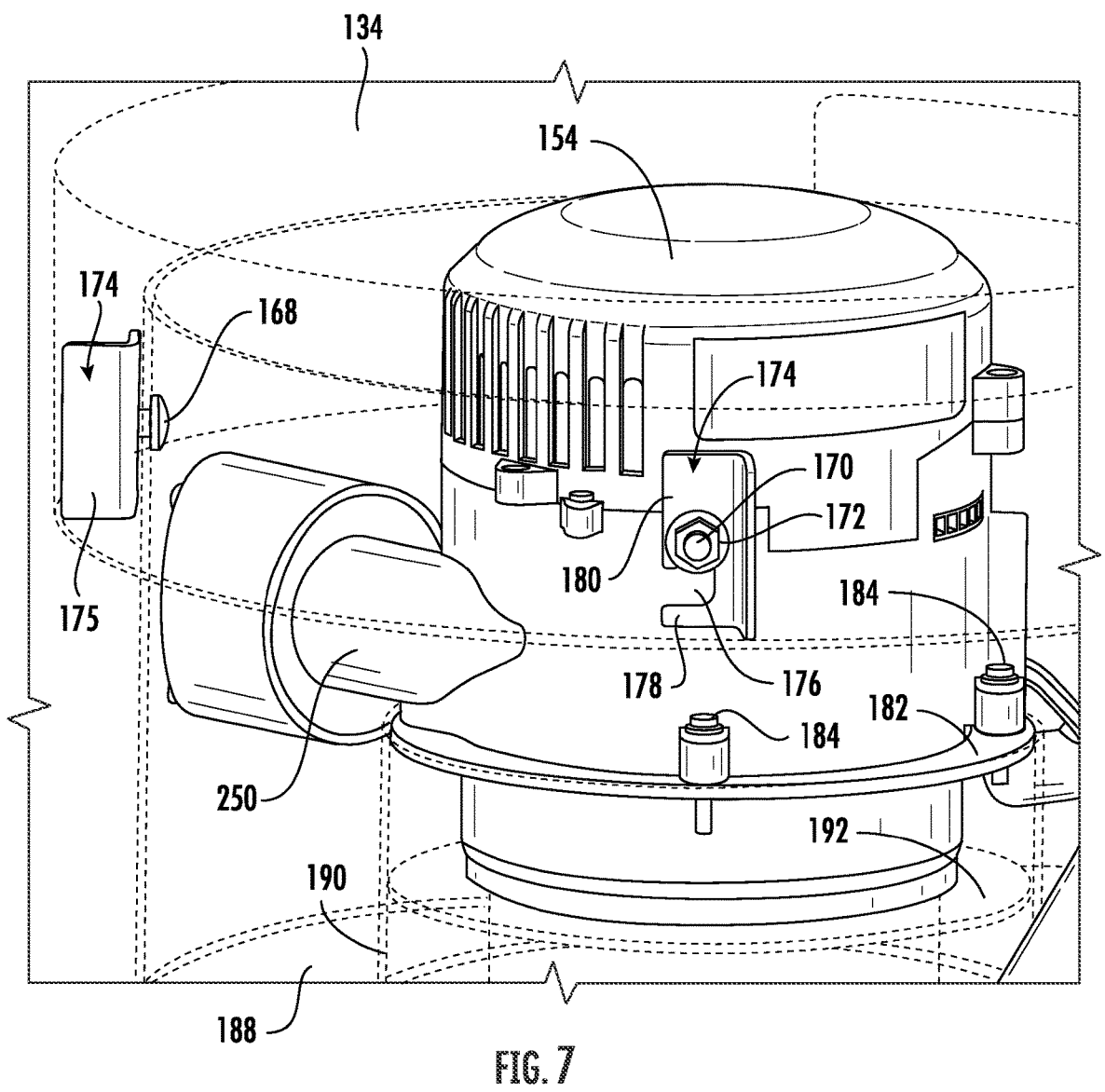
FIG. 7 is a perspective view of the motor containing portion of a vacuum canister system according to an aspect of the present disclosure having portions of the exterior housing and cap shown transparently to allow easier viewing of the interior components.
Figure 8:
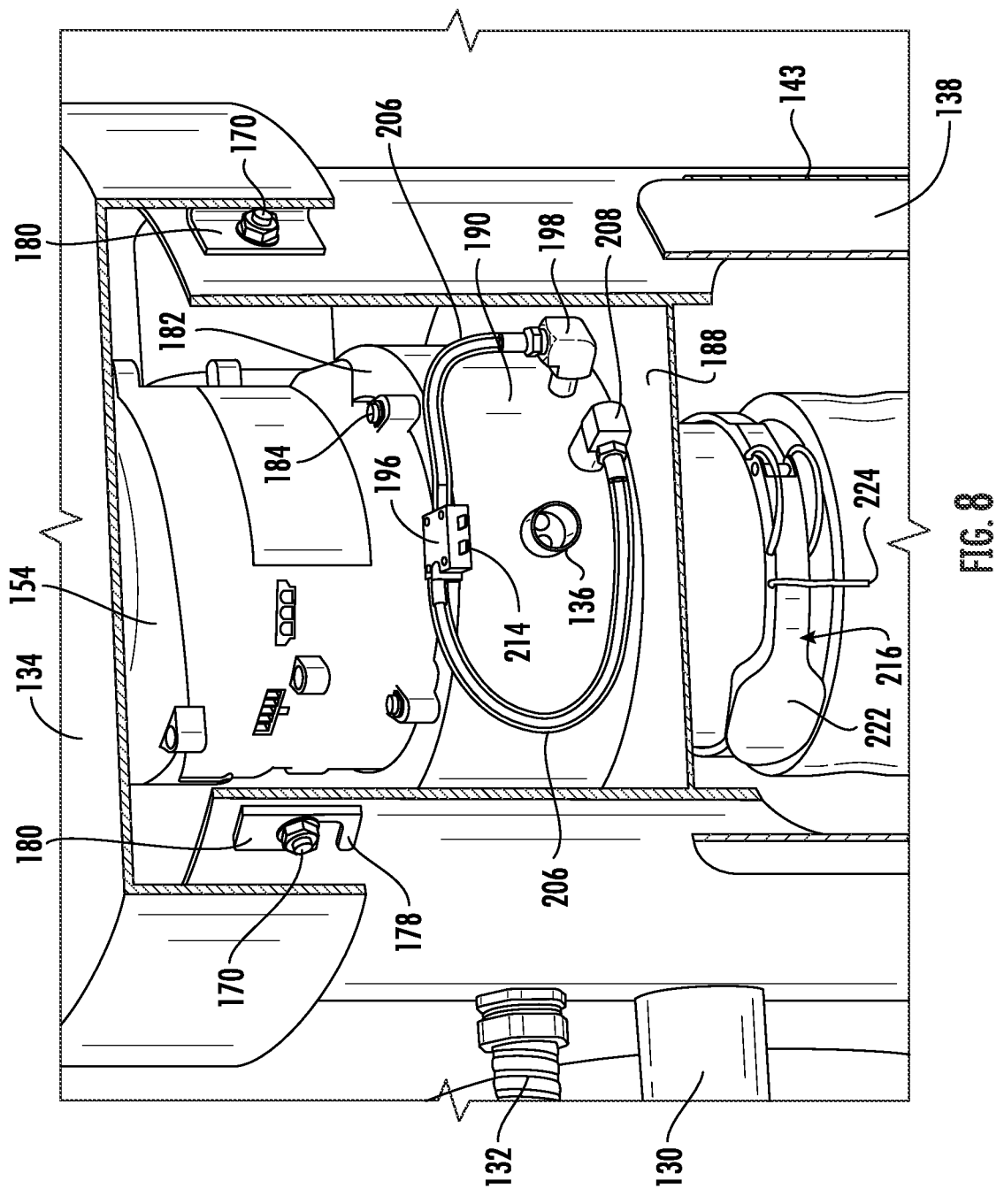
FIG. 8 is a cross-sectional view of the upper portion of a vacuum canister system according to an aspect of the present disclosure.
Figure 9:
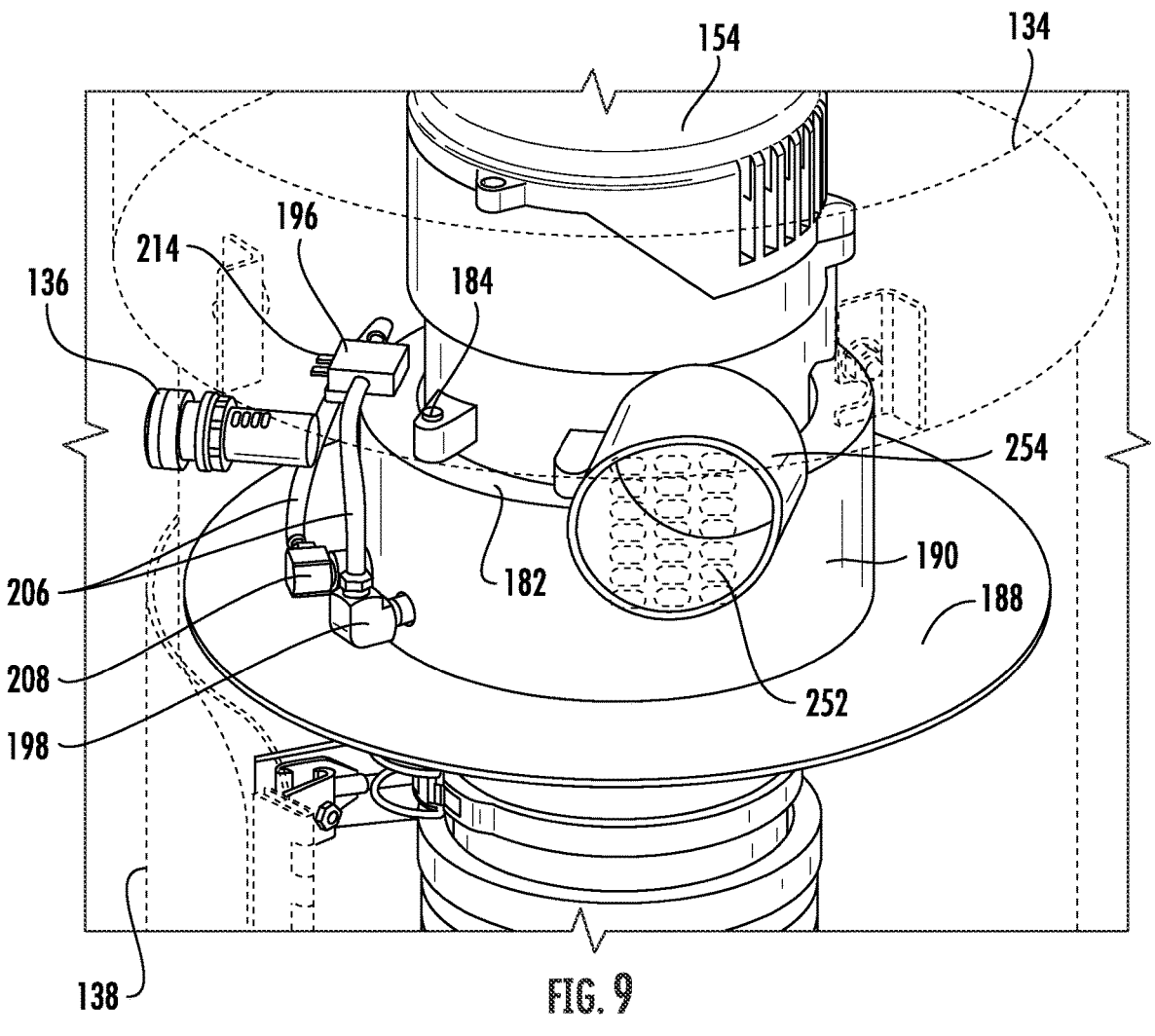
FIG. 9 is an interior perspective view of the upper portion of the vacuum canister system according to an aspect of the present disclosure.
Figure 10:
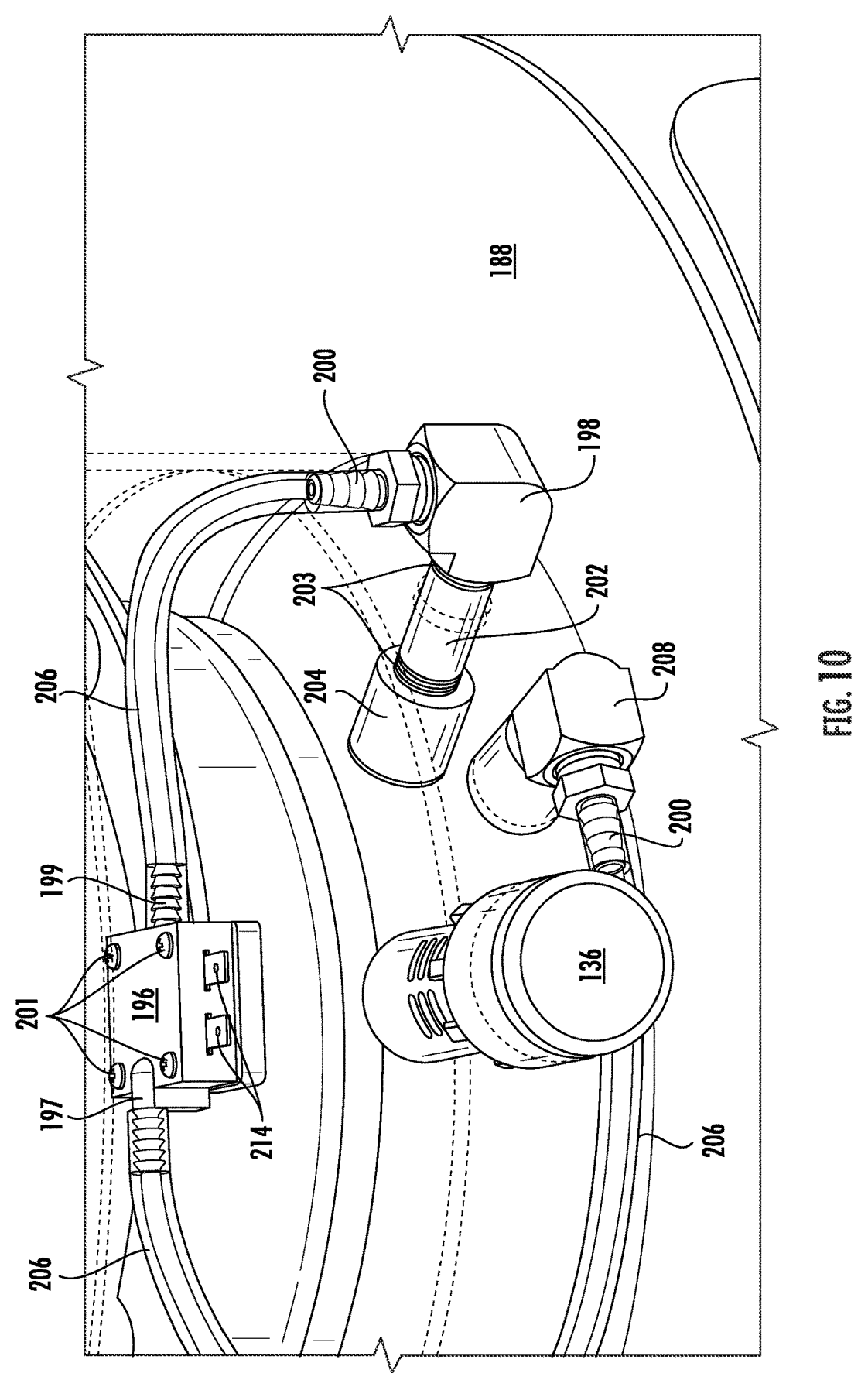
FIG. 10 is a close-up perspective view of the pressure switch and indicator system showing the air pressure inlets for the motor side and filter side of the exemplary system according to an aspect of the present disclosure.
Figure 11:
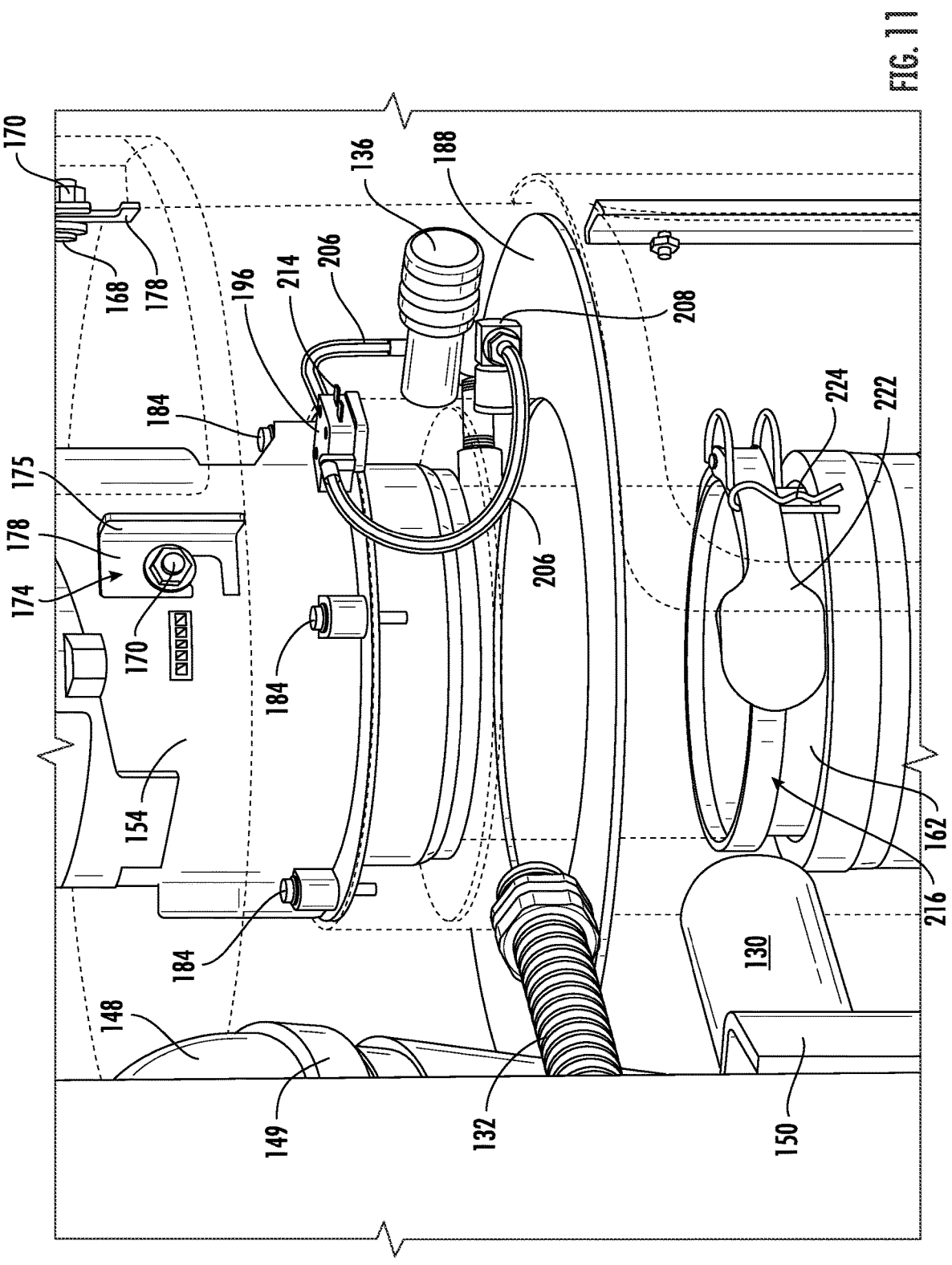
FIG. 11 is a perspective view of interior components of the upper portion of the vacuum canister system showing the attachment system for the air filter system and the pressure switch and indicator system according to an aspect of the present disclosure.

As shown primarily in FIGS. 6 and 7, the present disclosure also incorporates an exhaust air tubing channel 250 that delivers exhaust air from the motor 154 to the outward environment via a plurality of apertures 252 in the exterior surface of canister 141. Additionally, the exhaust air system typically incorporates a distal end tubular segment 254 that has a larger diameter than the exhaust tube 250 such that cool air from the outside environment is drawn in around it to prevent hot exhaust air from damaging the system.

The systems discussed above are generally direct current (DC) motor driven canister vacuum systems. While shown above as a suspended canister system, the canister systems with the indication systems and all individual and combinations of the vacuum system's features may also be employed in connection with a ground level stand-alone canister system that may or may not be associated with an arch suspension system as shown herein. In particular, the pressure sensing systems, filter engagement systems and construction, and indication systems for filter cleaning may be employed when one or more canister vacuum system at ground level and an associated hose directly connected thereto are employed.

While described in connection with direct current motor driven canister systems, the present indicator systems may also be employed in connection with central vacuum systems as well, which are typically driven by an alternating current (AC) motor to drive the overall system and provide suction, typically providing suction power to a plurality of arched vacuuming devices and locations at an overall vehicle washing facility. In the case of DC motor driven systems typically employed in the canister vacuuming systems of the present disclosure, a wireless relay system may be used exclusively to activate the motor and thus begin the process of use of the system by a user. To do so, the user may use a mobile application or payment system associated with the vacuuming system to start the motor and begin vacuuming.

As shown in FIGS. 15-26, a locking mechanism for the vehicle vacuuming system may also be employed whether or not a vehicle vacuuming system of the present disclosure employs any of the other features, such as, but not limited to the pressure differential notification systems, of the present disclosure or not. The locking mechanism(s) of the present disclosure may be used with either a canister vacuuming system as shown in the figures of the present disclosure, but would more typically be used in the case of a central vacuuming AC motor driven system. This is due to the fact that central vacuum AC motor driven systems are typically on when the facility is open providing suction to each of the systems at the same time and typically constantly. Currently, AC central vehicle vacuuming systems use a pinch valve in-line of the vacuum hose to stop suction from extending to a given vacuuming location in the central vacuum system when the system has not been paid. While DC systems may not need the locking mechanism of the present disclosure due to the fact that they are not active until payment is made and the motor activated by communication via the wireless relay to the DC motor, DC canister systems may employ the locking mechanisms of the present disclosure as well as shown in the figures. However, the central vehicle vacuuming systems may eliminate the various pinch valves from use to stop airflow and instead incorporate the locking mechanism of the present disclosure at the use location of each arch in the central vehicle vacuuming system to prevent the user from withdrawing the vacuuming tool and using it. Additionally, each of the systems and subsystems discuss herein may be used alone and/or in combination with any of the other features and systems of the present disclosure whether in connection with an independent canister system or a central vehicle vacuuming system.

Figure 15:
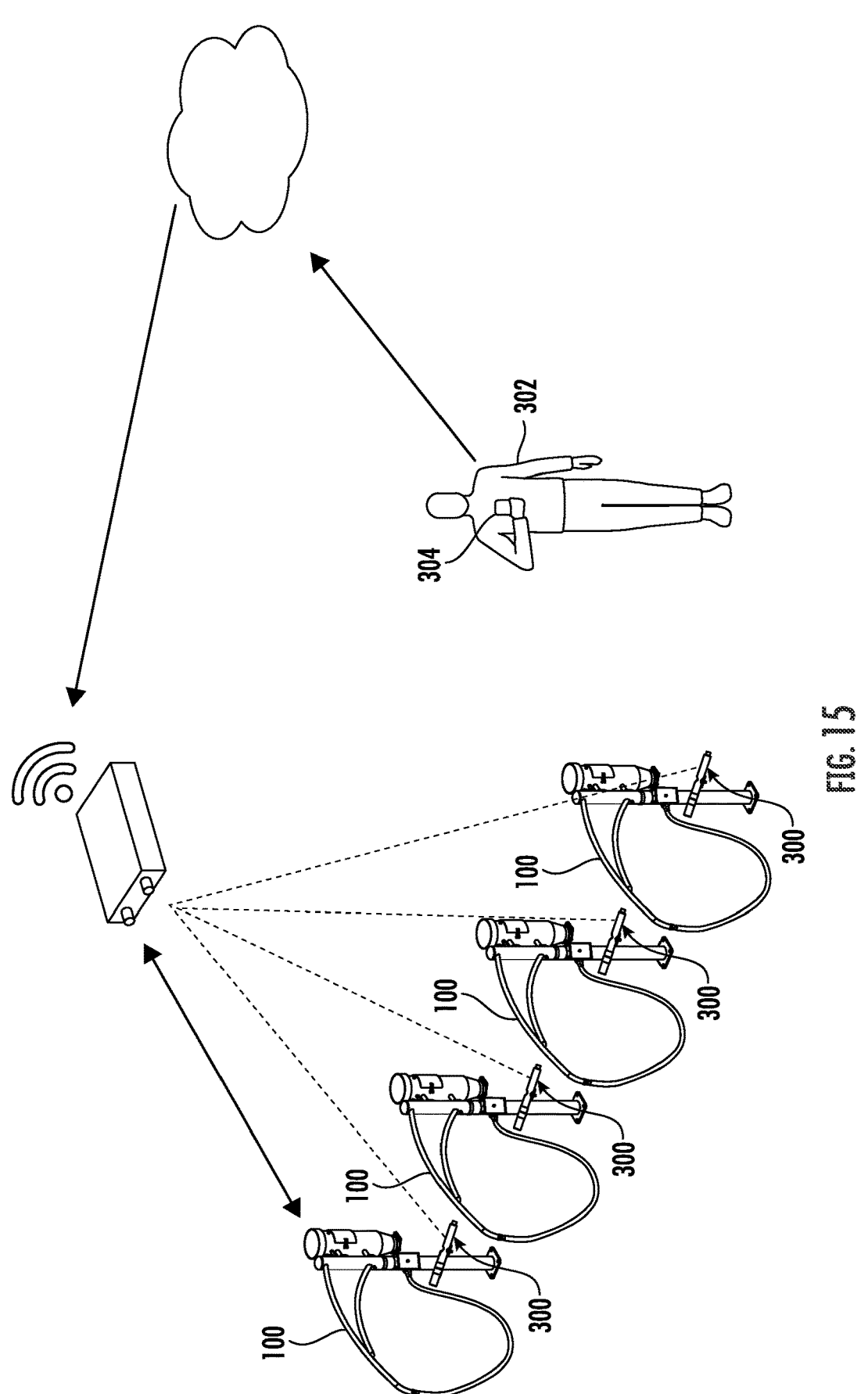
FIG. 15 is a schematic view of a vehicle vacuuming systems networking architecture according to an aspect of the present disclosure.

FIGS. 15-26 describe a locking mechanism that is a specific construction of the tool holder 124 that receives the vacuum tool 110. As discussed above, the locking mechanisms of the present disclosure, while shown in some of the Figures engaged with and integrated with a canister DC motor system, the locking mechanisms would more typically be used in connection with one or more of the vacuum tools of an AC motor driven central vacuum system and their use. FIG. 15 shows the implementation of a locking mechanism 300 that can be unlocked using a mobile computing device. Using any computing device with access to the internet through a wireless node and/or a cellular data connection or other communication signaling system, typically a mobile computing device utilize a mobile application or website accessible via the mobile computing device 304 or computer system, a user can provide instructions to any particular vehicle vacuuming system to unlock the vacuum tool 110 from the tool holder 124 by sending a signal to the locking mechanism to disengage. This process is depicted generally in FIGS. 16-22. The user may be a vacuum system owner a customer/end user.

Figure 16:
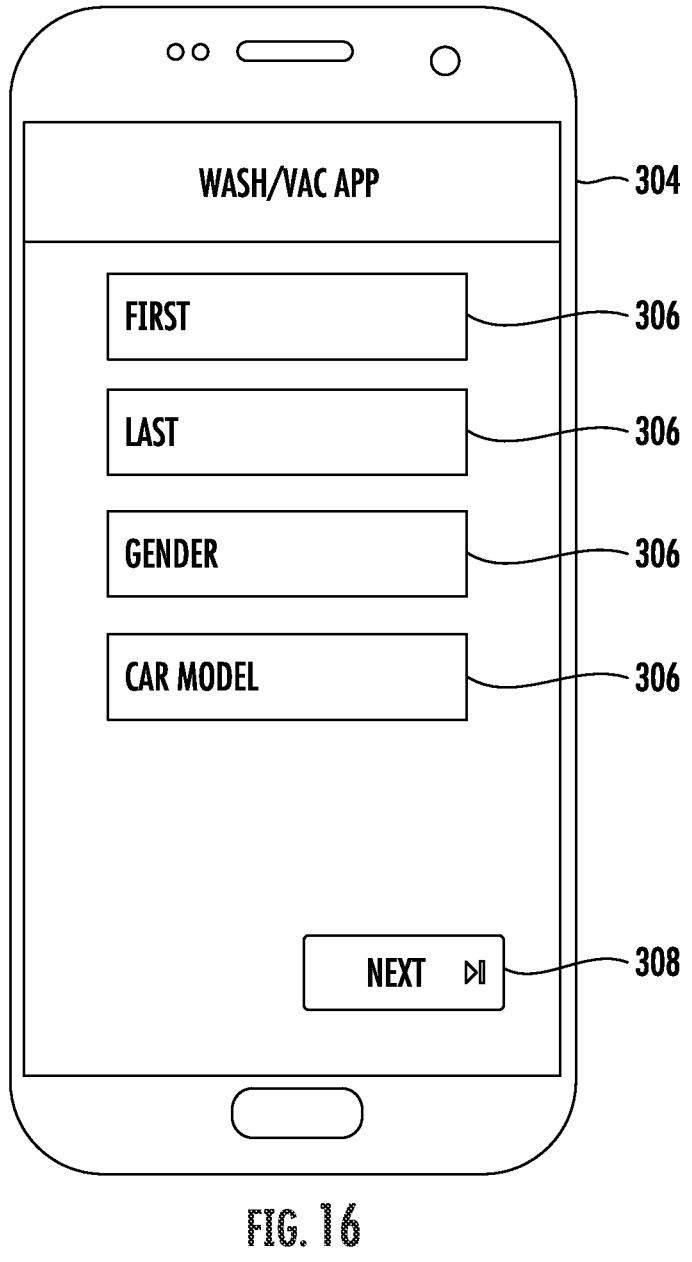
FIG. 16 is an exemplary mobile computing application data entry screen display requesting demographic information about the user and optionally the user's vehicle according to an aspect of the present disclosure.

FIG. 16 depicts an initial user interface display of a mobile application in accordance an aspect of the present disclosure. This data input screen allows the user to set up an account or otherwise enter demographic information such as the user's first name, last name, gender, car make, car model, electronic mail address, username, password or any combination of the foregoing using data entry fields 306. Once the required data and any optional data are entered into their respective data entry fields, the user can progress to the activation instruction initiation display screen of a typical mobile application according to an aspect of the present disclosure.

Figure 17:
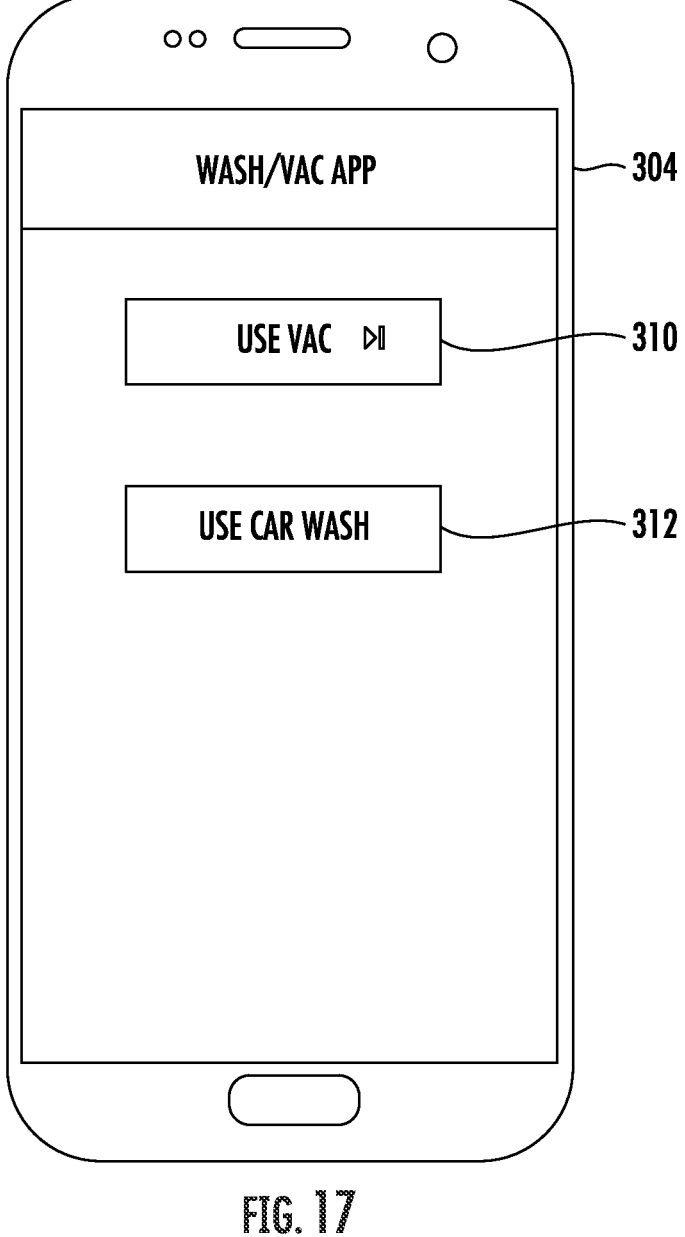
FIG. 17 is an exemplary activation instruction initiation display screen of an exemplary mobile application according to an aspect of the present disclosure.

A typical activation instruction initiation display user interface is shown in FIG. 17. The interface will typically have at least a vehicle vacuuming system unlocking activation link 310, but may also have another link such as a car wash use activation link 312 that would initiate a particular car vehicle washing protocol at a particular car washing system of a vehicle washing facility. In the case of activating the locking mechanism 300 of the present disclosure, the process of unlocking the locking mechanism 300 and releasing the vacuum tool 110 for use begins by activating link 310.

Figure 18:
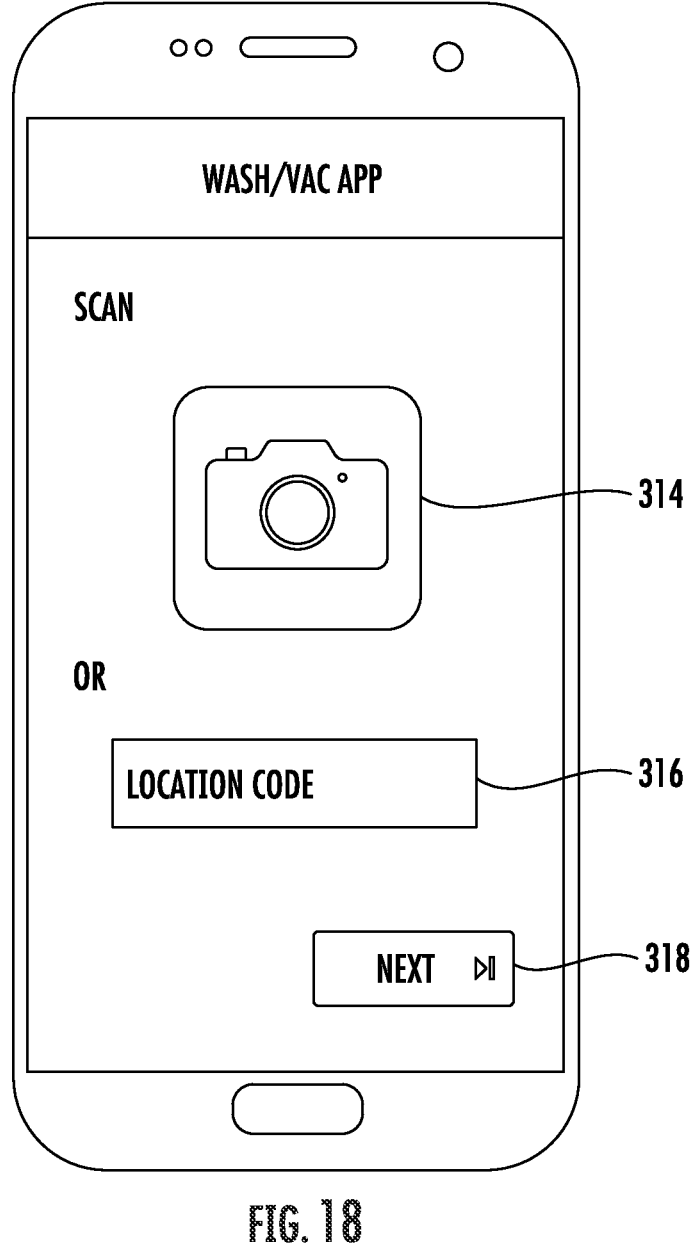
FIG. 18 is an exemplary data entry display screen of an exemplary mobile application allowing a user to either scan a QR or other optically readable code that is inputted into the mobile computing device using the mobile computing device's camera or an alphanumeric code inputted by the user via a data entry device, typically the touch screen computing devices corresponding to a particular vehicle vacuuming system.

Activating link 310 causes the graphical user display of FIG. 18 to be displayed. This display is an exemplary data entry display screen of an exemplary mobile application allowing a user to use the mobile computing device's camera to scan a quick response (QR) code or other optically readable barcode or visually perceptible code that may be scanned and inputted into the mobile computing device, typically using the mobile computing device's camera. This can be done by activating the function by selecting the icon 314, which activates access to the mobile computing device's camera to allow the camera to capture the visually perceptible code. Thereafter the code is wirelessly transmitted from the mobile computing device to a remote server system, which then typically communicates back to the mobile computing device the data related to the specific vehicle vacuuming system.

The display may also or instead have a data input field or data input fields 316 that allow for a user to input through a keyboard, touchscreen or other data entry device, an alphanumeric code, numeric code, zip code or any combination thereof. The code may be physically located on the vehicle vacuuming system that the user desires to activate or otherwise provided to the user. The input data might also be a map or geographic or schematic depiction of the vehicle washing facility and each of the vehicle vacuuming systems located at a given facility. A user could alternatively select which vehicle vacuuming system to unlock using a depiction and begin the process to unlock the locking mechanism of a particular vehicle vacuuming system by touching the depiction on a touch sensitive screen or using another data input device like a mouse and cursor. In the case of the use of a camera or a graphical map, once the visual information/selection of the particular vehicle vacuuming system is input into the mobile application, the mobile application or website will next typically automatically display the payment screen of FIG. 19. In the case where data is typed into the data input field 316, the "enter" or next activation button 318 is activated to move to the payment screen.

Figure 19:
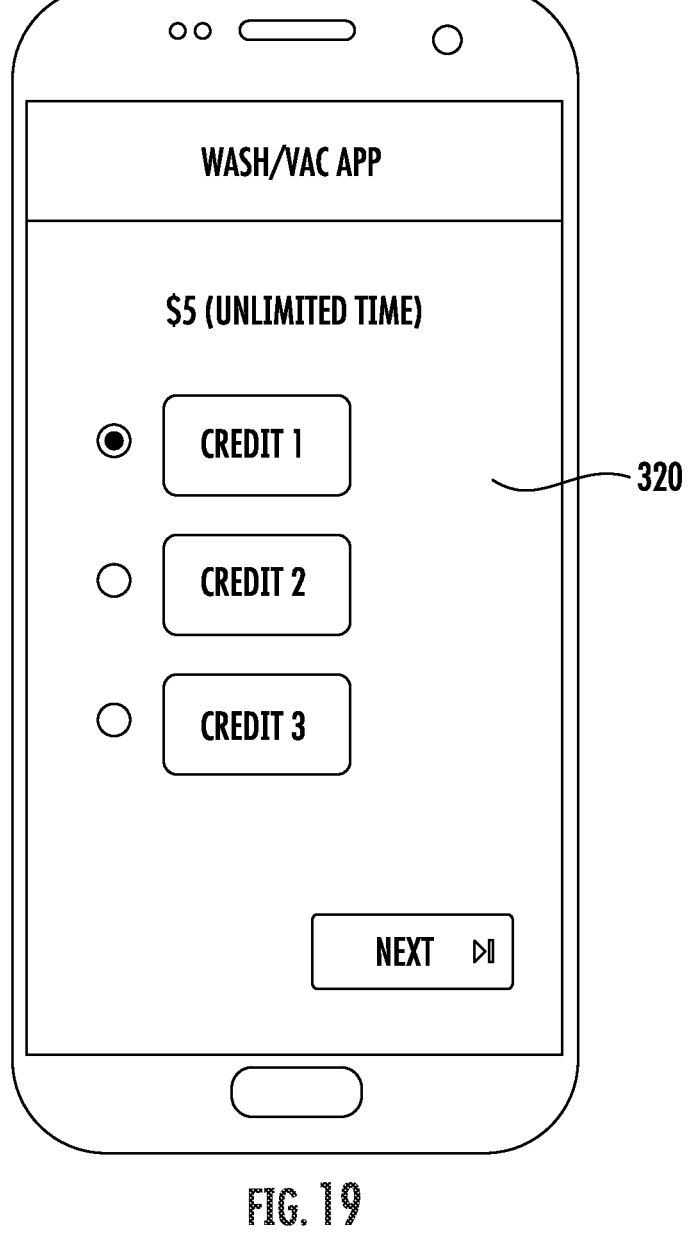
FIG. 19 is an exemplary payment screen of an exemplary mobile application according to an aspect of the present disclosure.

FIG. 19 is an exemplary payment screen 320 of an exemplary mobile application according to an aspect of the present disclosure. Once the particular vehicle vacuuming system is selected by the user and identified by the computing systems of the present disclosure, the system will receive payment for the use of the vehicle vacuuming systems of the present disclosure. To do so, the system may use credit card information that in inputted into the system by the user, a mobile payment system such as VENMO® or APPLE PAY®, which uses the EMV (Europay, Mastercard, and Visa) Payment Tokenization Specification, or GOOGLE PAY®. APPLE PAY® keeps customer payment information private from the retailer by replacing the customer's credit or debit card Funding Primary Account Number (FPAN) with a tokenized Device Primary Account Number (DPAN), and creates a dynamic security code for each transaction. The dynamic security code is the cryptogram in an EMV-mode transaction, and the Dynamic Card Verification Value (dCVV) in a magnetic stripe data emulation-mode transaction.

Figure 20:
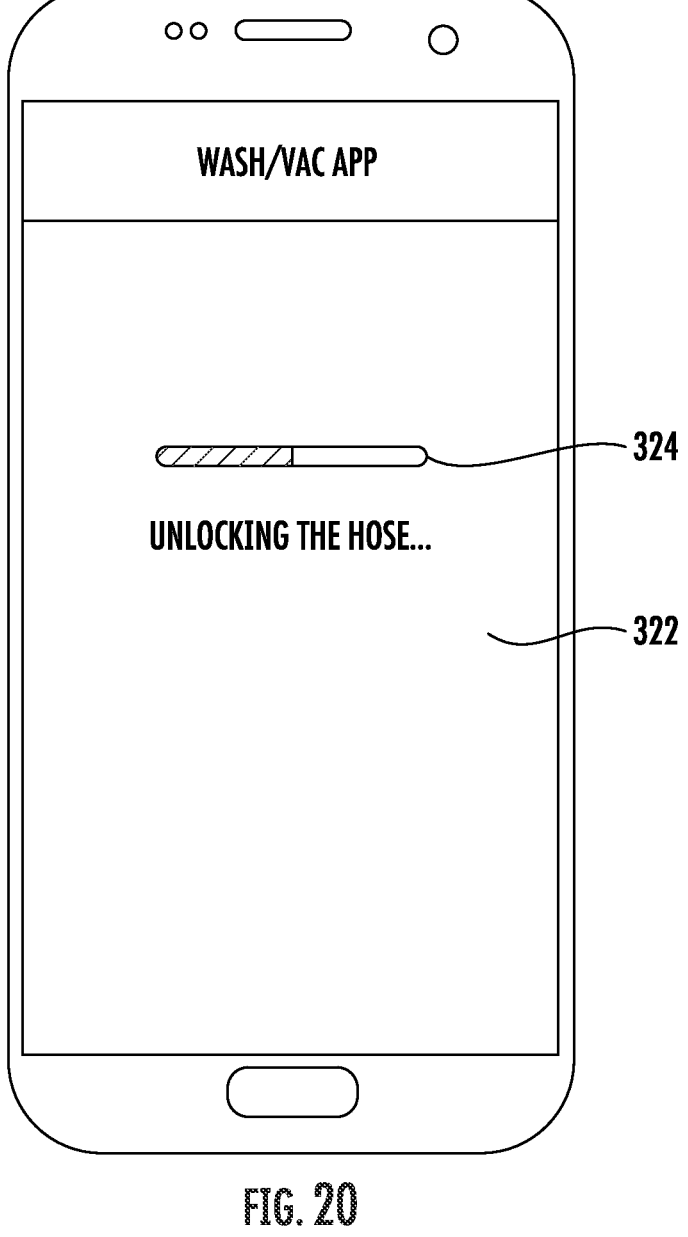
FIG. 20 is an exemplary vehicle vacuuming system activation status screen of an exemplary mobile application according to an aspect of the present disclosure.
Figure 21:
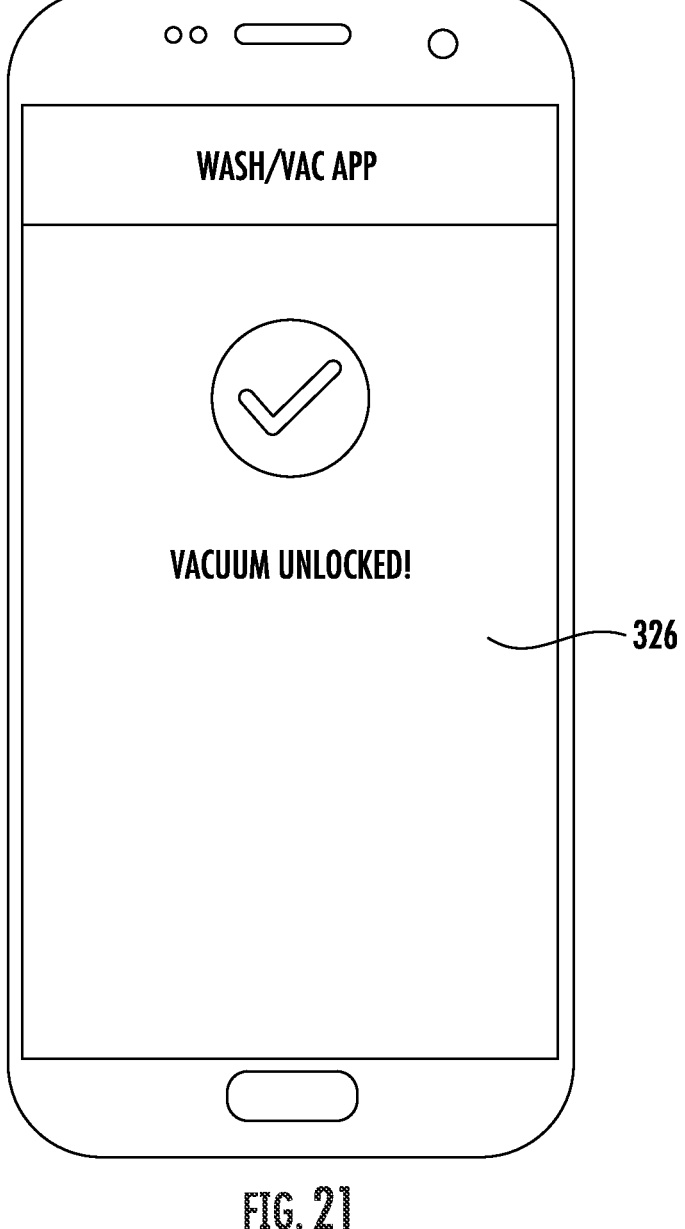
FIG. 21 is an exemplary activation completed notification screen of an exemplary mobile application according to an aspect of the present disclosure.

Once payment is made electronically using the mobile computing device, the website or mobile application display on the mobile computing device will typically thereafter display a vehicle vacuuming system activation status screen 322 as shown in FIG. 20. The screen may be omitted, but is typically employed to notify the user of the communication process status between the user's mobile computing device and the computer server systems connected to and controlling the locking mechanism 300. The status is typically shown using a progress bar 324. Once the system successfully communicates with the vehicle vacuuming system to unlock the locking mechanism, the display will typically show an activation completed notification screen 326 such as the one shown in FIG. 21. The screen will typically have a textual and/or pictorial representation of a successful unlocking and may further be accompanied by a vibration and/or audible indication to the user of success. Additionally, if the unlocking procedure is unsuccessful, a negative indicator or indicators of such might be displayed or provided vibrationally and/or audibly instead.

Figure 22:
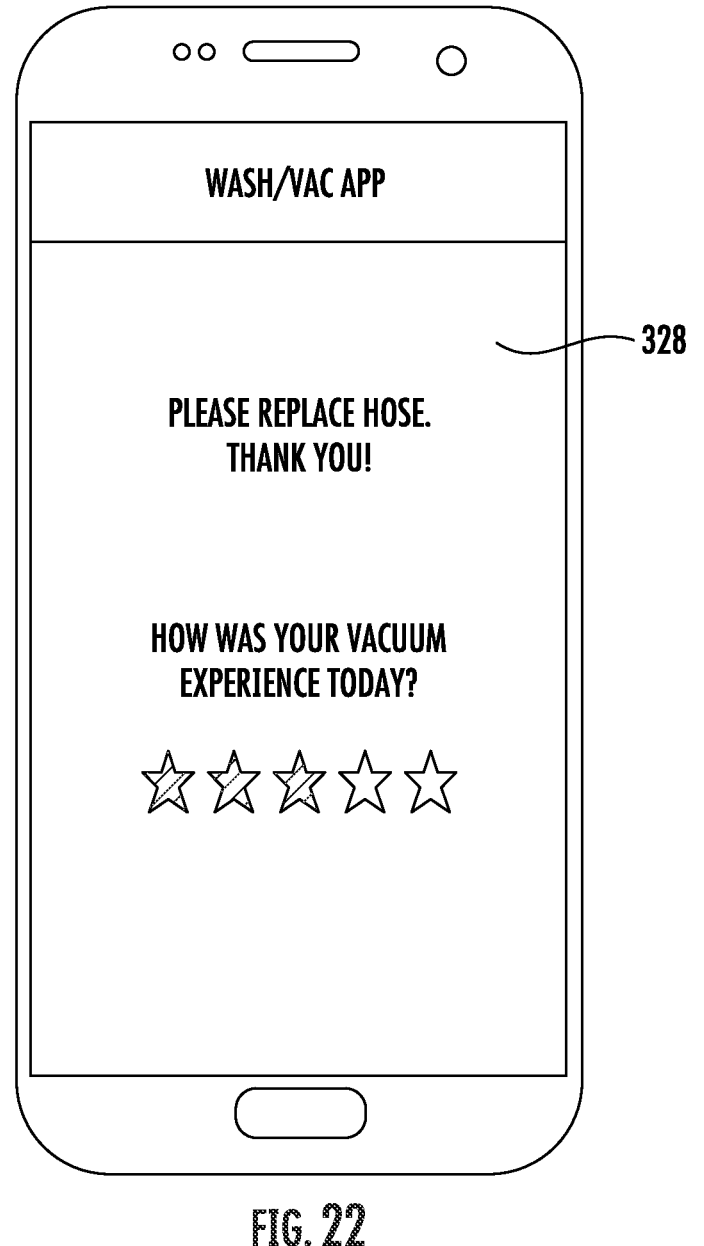
FIG. 22 is an exemplary optional end of use and user input receiving display screen of an exemplary mobile application according to an aspect of the present disclosure.
Figure 23:
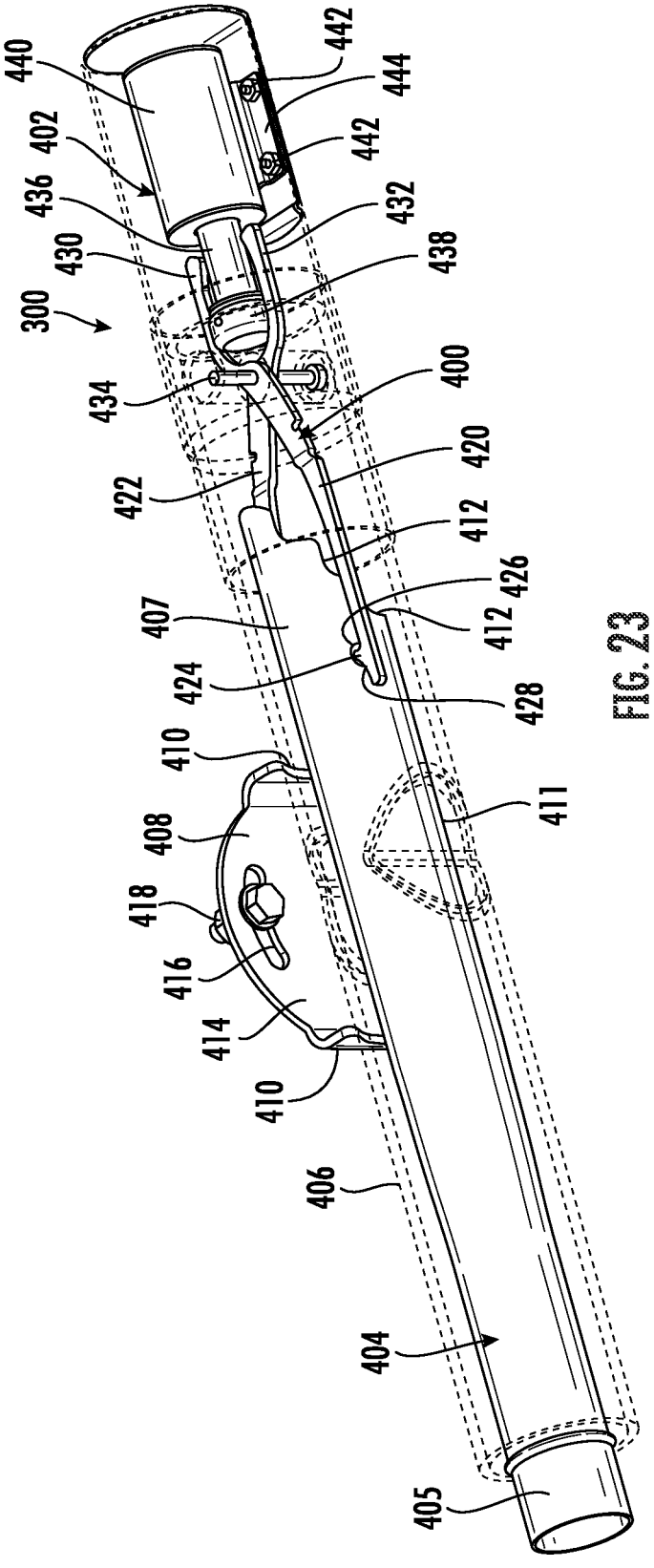
FIG. 23 is a perspective view of a vehicle vacuuming system locking mechanism according to an aspect of the present disclosure with the exterior housing transparently shown to allow the interior elements of the locking mechanism to be shown.

Finally, as shown in FIG. 22, an optional end of use and user input receiving display screen may be presented to the user to solicit feedback about the user's experience with the mobile activation process, mobile application, website and/or simply the vacuum experience as a whole including the functionality of the vehicle vacuuming system of the present disclosure.

In each instance of the above mobile application depictions, it is possible that that generic pictures of a car wash or vacuuming system may be used to show the various stages of the process; however, it is also contemplated that the application may be constructed to show the use a depiction of the system at the same location as the user or possibly even the particular vacuum system or car wash system being authorized in the process. This level of detail provides a greater level of interaction with the user and confirms for the user that they are undertaking the correct process to activate the correct car wash or vacuuming systems where they are located.

An embodiment of a locking mechanism 300 according to an aspect of the present disclosure is shown in FIGS. 23-26. The locking mechanism 300 of the present disclosure typically includes a grappling system 400 and a motorized actuator 402. The grappling systems is moved from a vacuum tool engaged position, which locks the vacuum tool 404 within the vacuum tool housing 406. The vacuum tool housing 406 is typically a hard metal or plastic material and is typically opaque to not allow the user of the overall vehicle vacuuming system employing the locking mechanism of the present disclosure from seeing the inside grappling system or the motorized actuator 402. While shown in the context of the present disclosure in connection with an arch-type vehicle vacuuming system, it is important to note that the locking mechanism, like the pressure indicator/filter cleaning indicator systems of the present disclosure, may also be employed in conjunction with a vacuum canister system.

The housing 406 is typically engaged to the lower support 116 using a bracket 408. The bracket 408 typically has two side walls 410 that have a curved surface designed to matingly engage the exterior surface of the housing 406, which is typically cylindrically shaped. The housing could conceivably be cuboid shaped, but is not typically done so because at least part of the vacuum tool 404 is often cylindrical at one end 405 to mate with a vacuum hose and a crevasse tool end that is rectangular in cross section portion at the opposite end 407, but with an angled end to allow the user to clean confined spaces within a vehicle. As shown in FIGS. 23-26, the crevasse tool can further optionally have stepped end sections 412 or other end surface features to facilitate cleaning.

The bracket 408 further typically has an archuous aperture 416 within the top and bottom of the main bracket plate surface 414 that engages a nut and bolt system 418 that is used to secure the bracket 408 to the lower support 116 or other surface where the locking mechanism will be engaged. Conceivably the locking mechanism may be engaged to a flat surface such as a wall or concrete structure instead of a cylindrically-shaped support or other shaped upwardly extending support pole. Essentially, the bracket can be constructed to mount to essentially any surface proximate the vehicle parking stall where the user will use a vehicle vacuuming system according to any aspect of the present disclosure. The archuous aperture is such that the location for the bolt will change the angle of the housing 406 enabling an inclined position for the housing which may be desirable to facilitate insertion of the vacuum tool after use by the user. Essentially, this allows the facility to orient the housing as a holster for the vacuum tool.

The grappling system 400 of one embodiment of the present disclosure may be a scissor-type system with a first vacuum tool engagement arm 420 and a second vacuum tool engagement arm 422. Each vacuum tool engagement arm 420, 422 has at least one vacuum tool engaging projection 424 that projects away from the engagement arm. The vacuum tool engaging projections 424 are typically sized to matingly engage a depression 426 on the exterior surface of the side of the vacuum tool and typically have a curved surface 428 such that the vacuum tool 404 can easily push past the projections 424 when the user inserts the tool into the housing until the projections 424 encounter the depressions 426 on each side of the vacuum tool 404. The interior of the housing 406 is indented portion 411 on both opposing sides within a portion/interior volume of the housing that typically retains the crevasse tool, which has a rectangular cross section. As such, the user must insert the vacuum tool 404 in the correct orientation to be received between the first vacuum tool engagement arm 420 and the second vacuum tool engagement arm 422, forcing them apart and allowing the arms to move along the sides of the crevasse portion of the vacuum tool until the vacuum tool engagement projections of each arm "snap" or "pop" into engagement with their corresponding depressions on the sides of the crevasse portion of the vacuum tool.

The first vacuum tool engagement arm 420 and the second vacuum tool engagement arm 422 connect with and rotate about a pivot pin 434. The rearward portion 430 of the first vacuum tool engagement arm extends from the pin to the opposite side of the interior of the housing and around the electrically actuated piston 436, which has a piston cap 438 on the end that has a larger radius than the piston 436. Similarly, the rearward portion 432 of the second vacuum tool engagement arm extends from the pin to the opposite side of the interior of the housing and around the electrically actuated piston 436 and piston cap 438. As such, when actuated, the solenoid 440 pulls the piston and piston cap into the retracted position (see FIG. 26) thereby forcing the rearward portions 430, 432 apart, which in turn moves the first vacuum tool engagement arm 420 and the second vacuum tool engagement arm 422 outward laterally into a vacuum tool disengaged position during the entire use time of the vehicle vacuuming system.

Once the time period of paid use expires, the solenoid activation stops, the motor of the vacuum canister stops and the piston extends such that the first vacuum tool engagement arm 420 and the second vacuum tool engagement arm 422 moves inwardly laterally into a vacuum tool engaging position such that the arms engage the tool as discussed above when the user reinserts the tool into the housing.

While the locking mechanism typically employs a solenoid, another force applicator or actuator for the piston and piston cap such as an electrically driven motor with a rotatable cam action in place of the plunger may be used instead. Any system that can selectively bias the piston and piston head between the extended and retracted positions may be utilized. The solenoid is typically engaged to the interior of the housing via a plurality of fasteners, which are typically nut and bolts 442, two on each side of the mounting plate 444, which can be flat or have an outwardly convex surface that typically matingly seats along the curved interior wall of the cylindrical housing.

Figure 24:
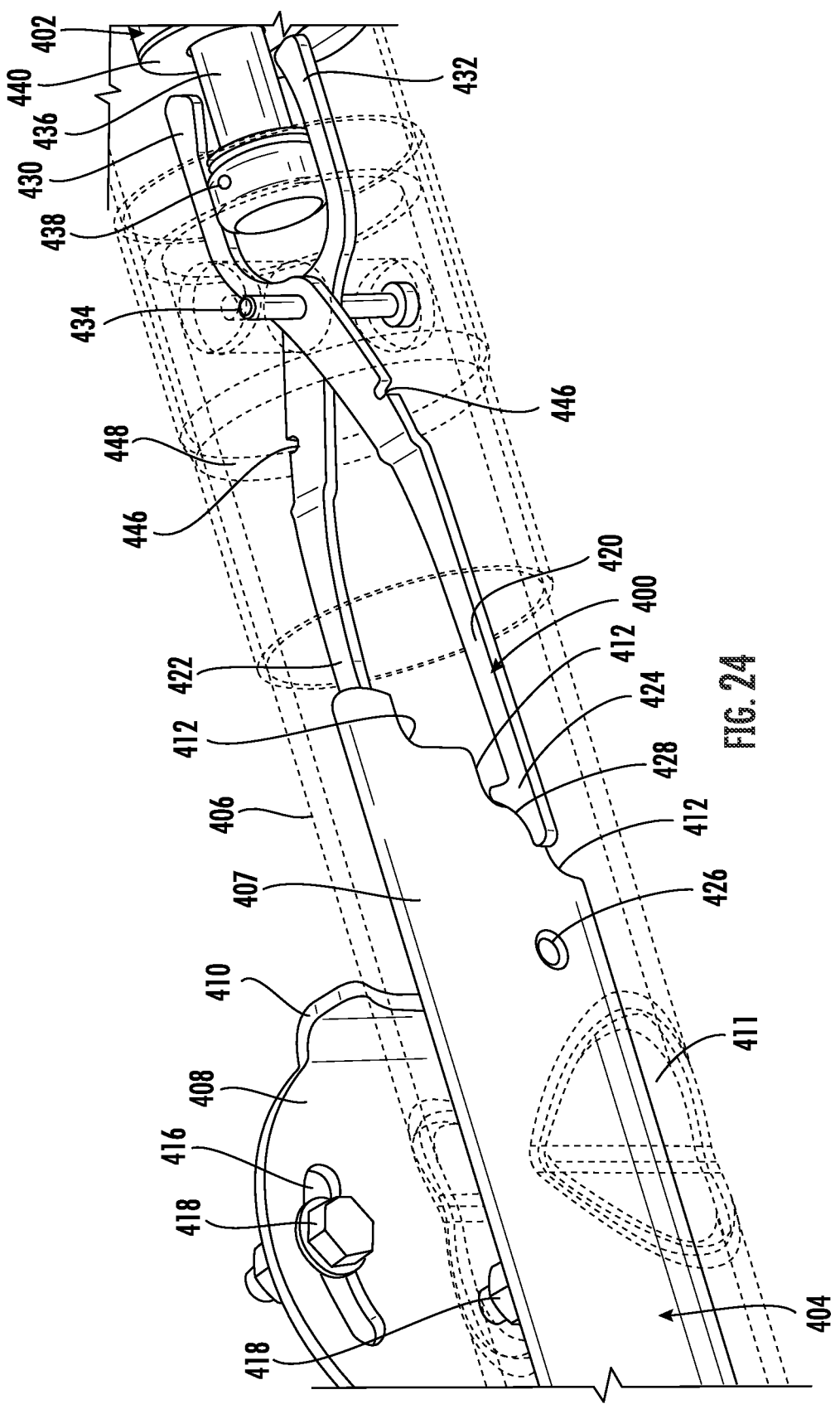
FIG. 24 is an enlarged perspective view of a vehicle vacuuming system locking mechanism according to an aspect of the present disclosure with the exterior housing transparently shown to allow the interior elements of the locking mechanism to be shown.
Figure 25:
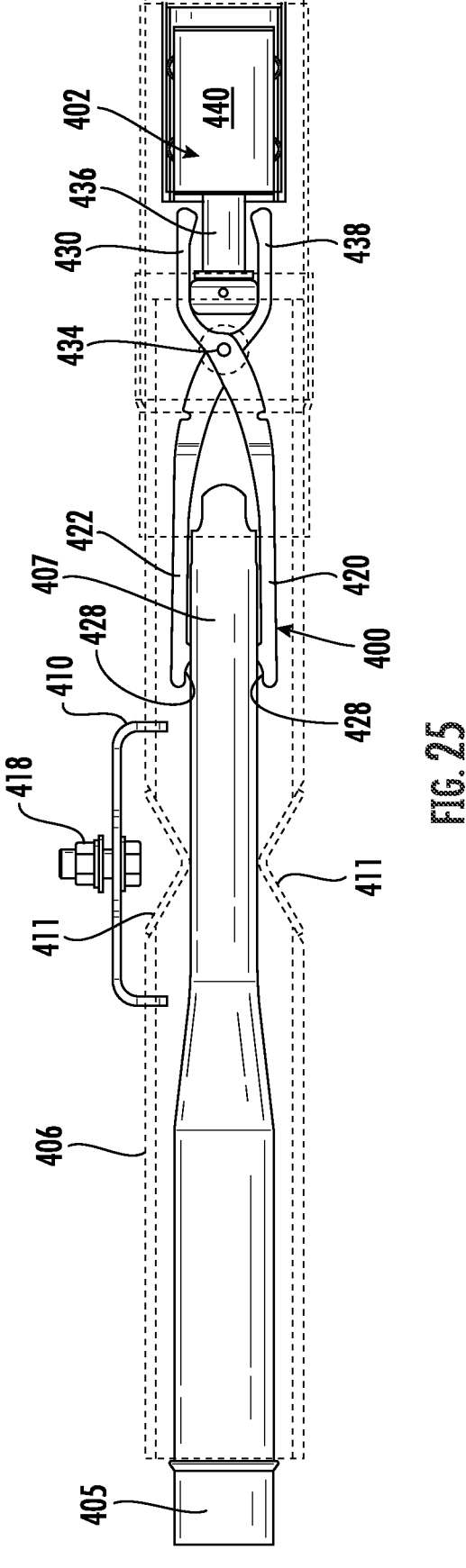
FIG. 25 is a top view of a vehicle vacuuming system locking mechanism according to an aspect of the present disclosure with the exterior housing transparently shown to allow the interior elements of the locking mechanism to be shown.
Figure 26:
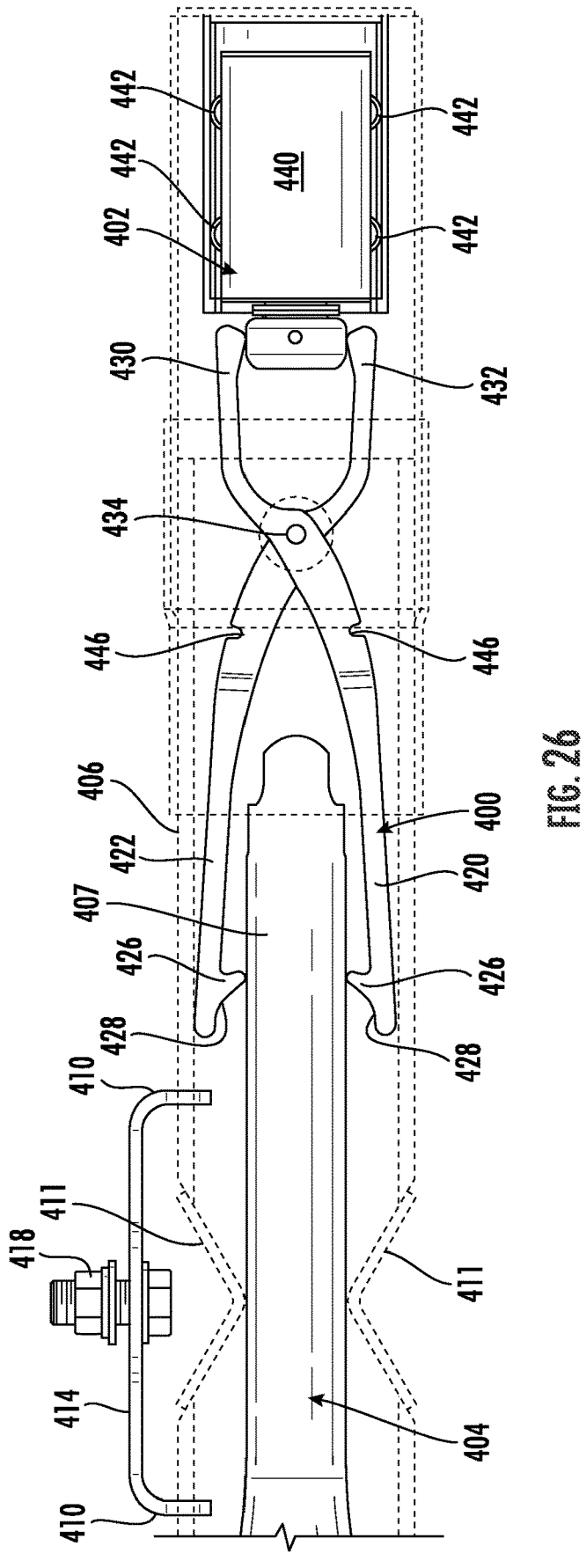
FIG. 26 is an enlarged a top view of a vehicle vacuuming system locking mechanism according to an aspect of the present disclosure with the exterior housing transparently shown to allow the interior elements of the locking mechanism to be shown.

As shown in FIG. 24, the outside surface of the first vacuum tool engagement arm 420 and the second vacuum tool engagement arm 422 typically have an outwardly facing notch 446 that engages an interior projecting lip 448 on the interior surface of the housing when the arms are in the disengaged position.

Figures 31, 32:
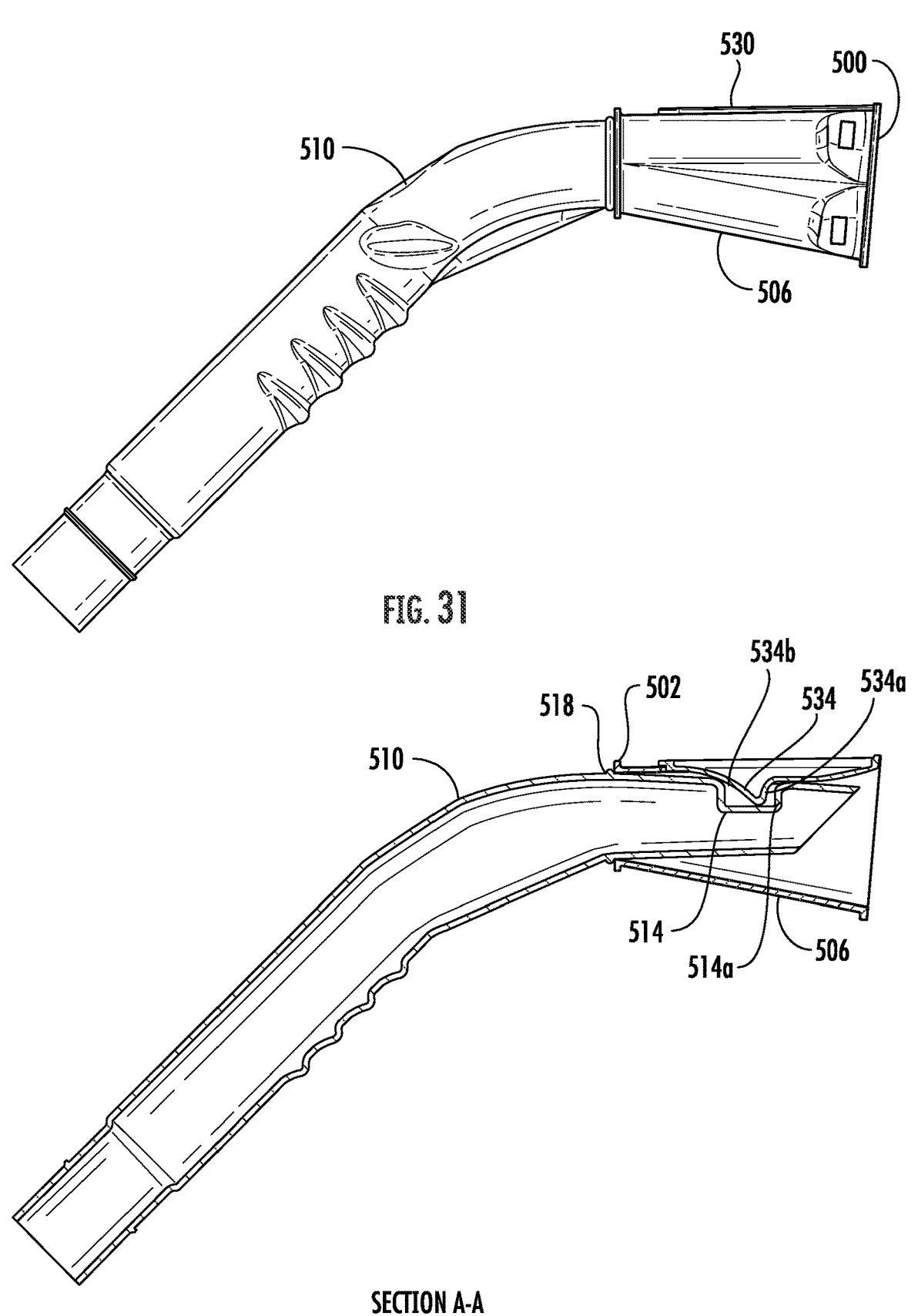
FIG. 31 is a side view of a vehicle vacuuming system holder assembly according to an aspect of the present disclosure showing the sealing aspects of the vacuum tool and the vacuum tool holder.
FIG. 32 is a cross-section A-A as shown in FIG. 27 of a vehicle vacuuming system holder assembly according to an aspect of the present disclosure showing the lock tooth and locking indentation interface.

Another embodiment of a grappling system is a rocker tool system as depicted in FIGS. 27-36. The rocker system includes a tool 510 such as a claw tool or a crevasse tool like the tool 110 shown in FIG. 2. The tool 510 however, includes a locking indentation 514 that allows the tool locker tooth 534 to hold the tool in place either in a locked or unlocked state as will be described in more detail below. The crevasse tool 510 may further include grips 512 for a user to easily grab and control the tool 510, and a vacuum hose connect 516. A flange 518 may be located near the end of the crevasse tool 510 to provide a substantially airtight seal to a corresponding flange 502 on the vacuum tool housing 506 when the crevasse tool 510 is in the engaged position with the vacuum system prior to use by a user as shown in FIGS. 31-32. A vacuum force provided by a central vacuum system may provide added sealing force around the flange.

The vacuum tool housing 506 may attach directly to the lower support 116 using fastener attachment points 501 and the flange 500 that provides for a substantially airtight seal to the lower support 116. A slot 504 may be formed in a top portion of the vacuum tool housing 506 to provide a space for a tool locker 530 to be slid into place. The vacuum tool housing slot 504 may include an interior facing wall 505. The tool locker 530 includes a corresponding outwardly facing wall 540 that is formed between an upper flange 536 and a lower flange 538. The upper and lower flanges 536, 538 create a small interference fit with the wall of the vacuum tool holder 506 about the slot 504. The interior facing wall 505 of the vacuum tool holder 506 and the corresponding exterior facing wall 540 of the tool locker 530 interface to provide a substantially airtight seal to the interior of the vacuum tool holder 506. The tool locker 530 may also include a flange 532 that corresponds to the flange 500 of the vacuum tool holder 506 to provide an aesthetically pleasing uniform flange for the assembly of the vacuum tool holder 506 and the tool locker 530.

As shown in FIG. 32, when the tool 510 is placed in the vacuum tool holder 506, the nose 515 of the of the tool 510 inserted into the holding aperture 501 of the vacuum tool holder 506. The tool 510 is rocked such that the nose 515 is rotated downwardly and out of the way of the locker tooth 534. The tool is then urged into the vacuum tool holder until the locking indentation 514 passes the locker tooth 534. The tool 510 is then released and gravity acting on the hose end 516 (with a hose attached, not shown) will urge the hose end 516 downwardly and the tool 510 will rotate about the lower portion of the holding aperture 501 and urge the nose end 515 upwardly such that the locker tooth engages the locking indentation.

The locker tooth may include a substantially vertical face 534a and the locking indentation may include a corresponding substantially vertical face 514a that interface to prevent the tool 510 from falling out of the vacuum hose holder 506. Gravity continuously urges the hose end 516 downwardly and the nose 515 of the tool 510 upwardly and the vertical faces 514a, 534a into constant contact until a user overcomes gravity pulling upwardly on the hose end 516 to rotate the tool 510 within the vacuum tool holder 506 to urge the nose 515 downwardly and the vertical faces 514a, 534a out of contact with one another. At this point the tool 510 may be removed from the vacuum tool holder and used by a user.

The locker tooth 534 may include a ramp 534b that urges the nose 515 downwardly gently as the user urges the tool 510 into the vacuum tool holder 506 until the locking indentation 514 passes the locker tooth 534. At that point, gravity acting on the hose end 516 (with a hose attached, not shown) will urge the hose end 516 downwardly, rotate about the lower portion of the holding aperture 501, and urge the nose end 515 upwardly with the locking indentation coupling with the locker tooth to prevent the tool 510 from falling out of the vacuum hose holder 506 as described in detail above.

Figures 27, 28:
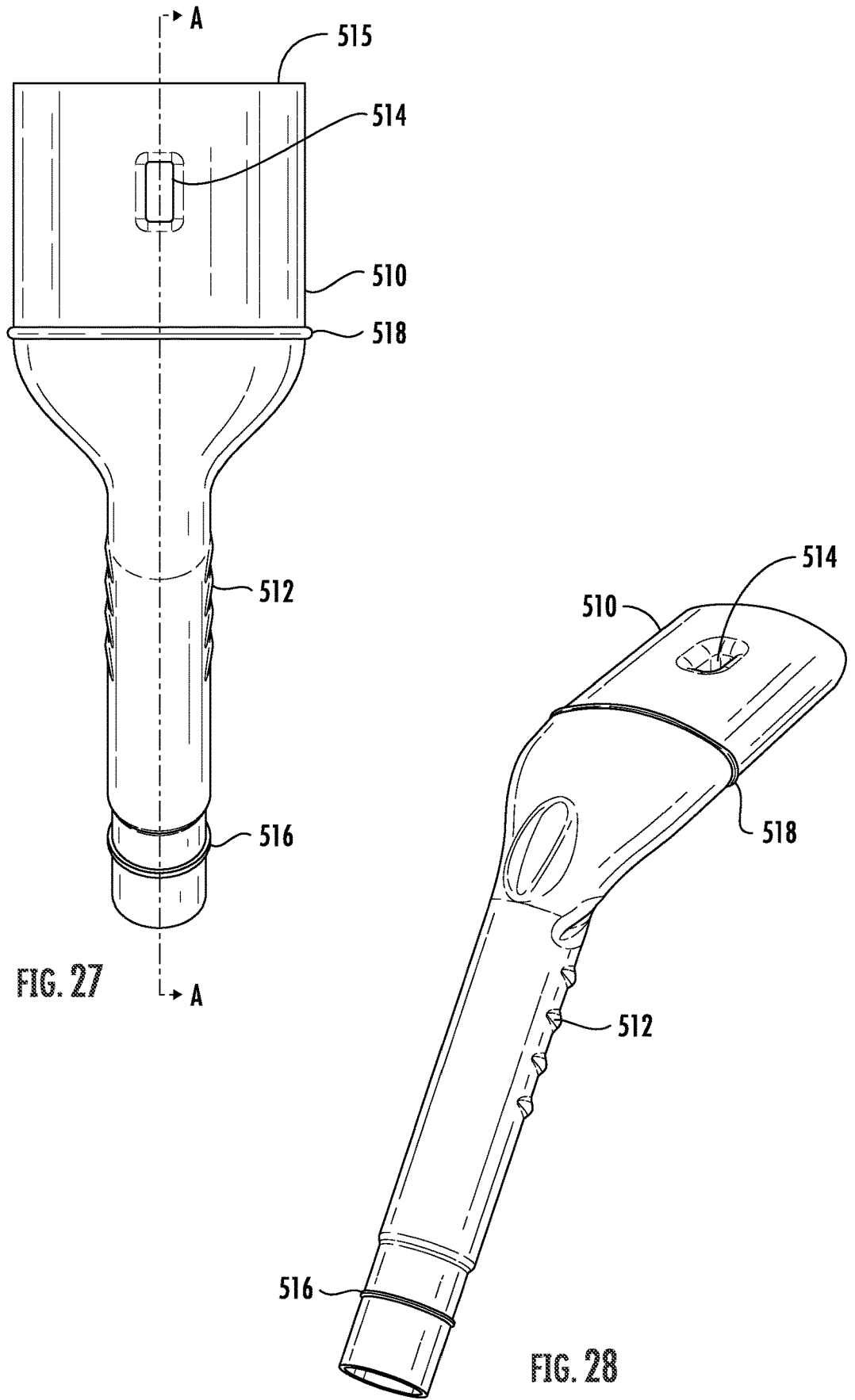
FIG. 27 is a top view of a vehicle vacuuming system vacuum tool according to an aspect of the present disclosure.
FIG. 28 is a perspective view of a vehicle vacuuming system vacuum tool according to an aspect of the present disclosure.
Figure 29:
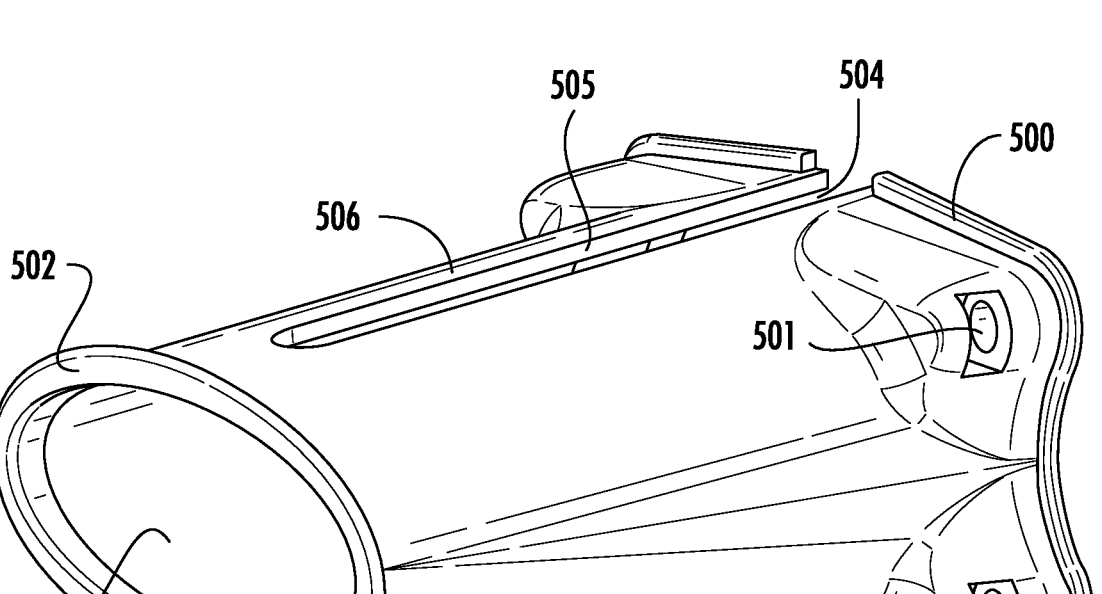
FIG. 29 is a perspective view of a vehicle vacuuming system vacuum tool holder according to an aspect of the present disclosure.
Figure 30:
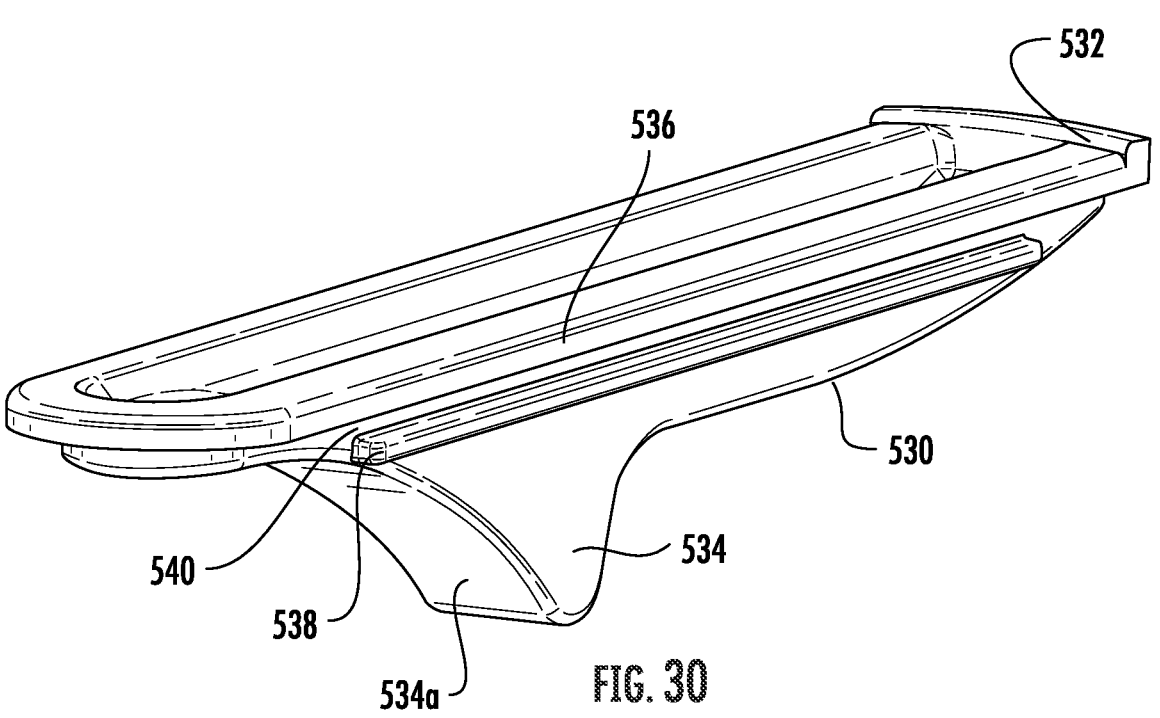
FIG. 30 is a perspective view of a vehicle vacuuming system vacuum tool locker according to an aspect of the present disclosure.

In another embodiment as shown in FIGS. 33-36 has two differences from the embodiment shown in FIGS. 27-32, but it should be known to one of ordinary skill that elements of the embodiments from FIGS. 23-26, FIGS. 27-32, and FIGS. 33-36 may be used interchangeably without deviating from the scope of the disclosure. FIGS. 33-36 also use the same Section A-A as shown in FIG. 27. The embodiment shown in FIGS. 33-36 includes a lock mechanism (similar to the embodiment of FIGS. 23-26), but is similar in design to the embodiment shown in FIGS. 27-32.

In addition to simply holding the tool 510 in place, the vacuum tool holder 506 may further include a mechanism to lock the tool 510 in the holder 506 until such time as a payment is received or another event as described in detail above. The locking mechanism may include a lock pawl 550 mounted to a plunger 552 that may be attached to a solenoid (not shown) or another linear movement actuator as shown and described above. In the locked position, the pawl 550 prevents the nose 515 from rotating downwardly, and therefore the vertical surfaces 514a, 534a cannot move out of engagement to allow the tool 510 to be removed from the holder 506.

Figures 33, 34:
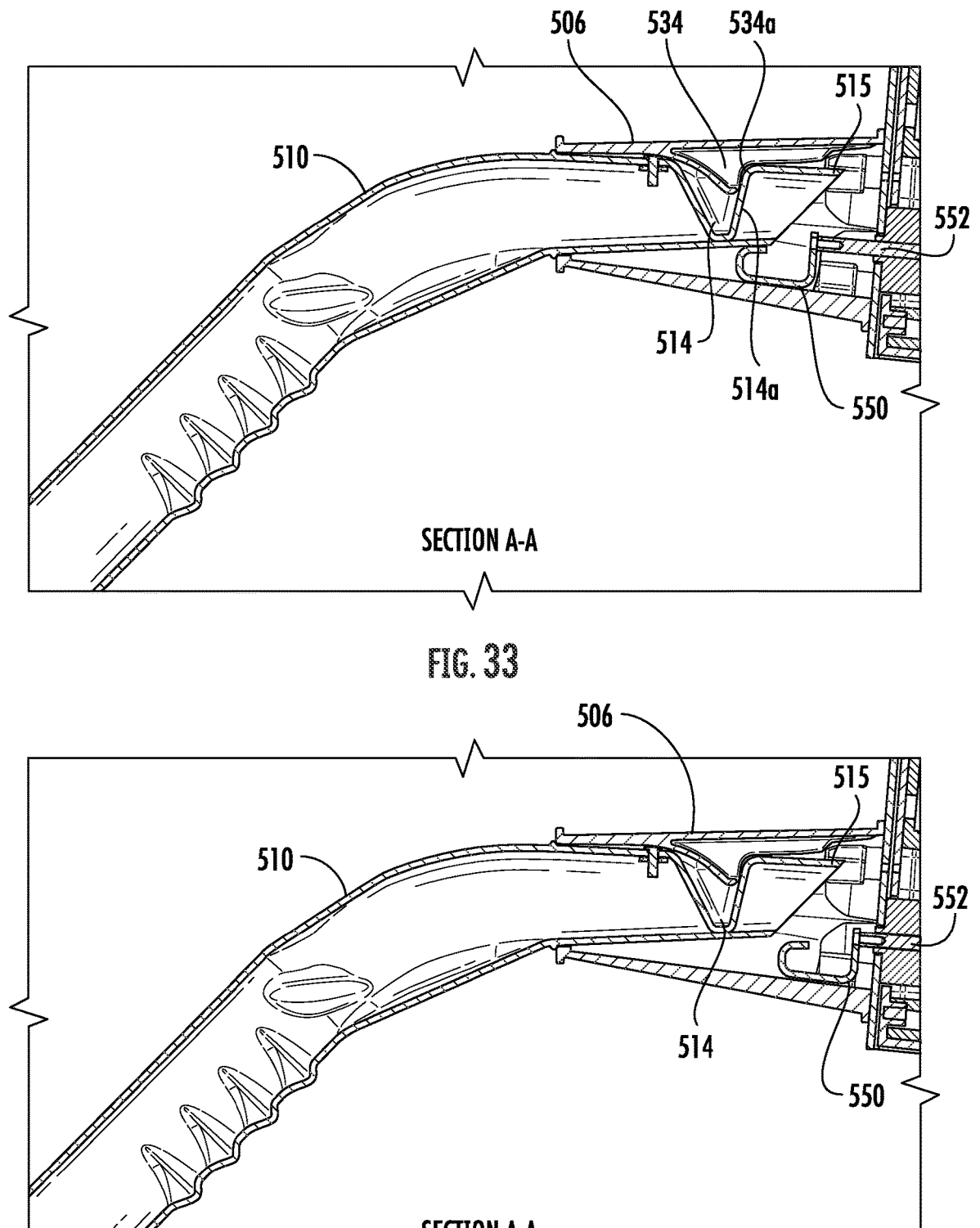
FIG. 33 is a cross-section A-A as shown in FIG. 27 of a vehicle vacuuming system holder assembly according to another aspect of the present disclosure showing the lock tooth and locking indentation interface with respect to a lock pawl in the locked position.
FIG. 34 is a cross-section A-A as shown in FIG. 27 of a vehicle vacuuming system holder assembly according to another aspect of the present disclosure showing the lock tooth and locking indentation interface with the lock pawl moved to a free position.
Figure 35:
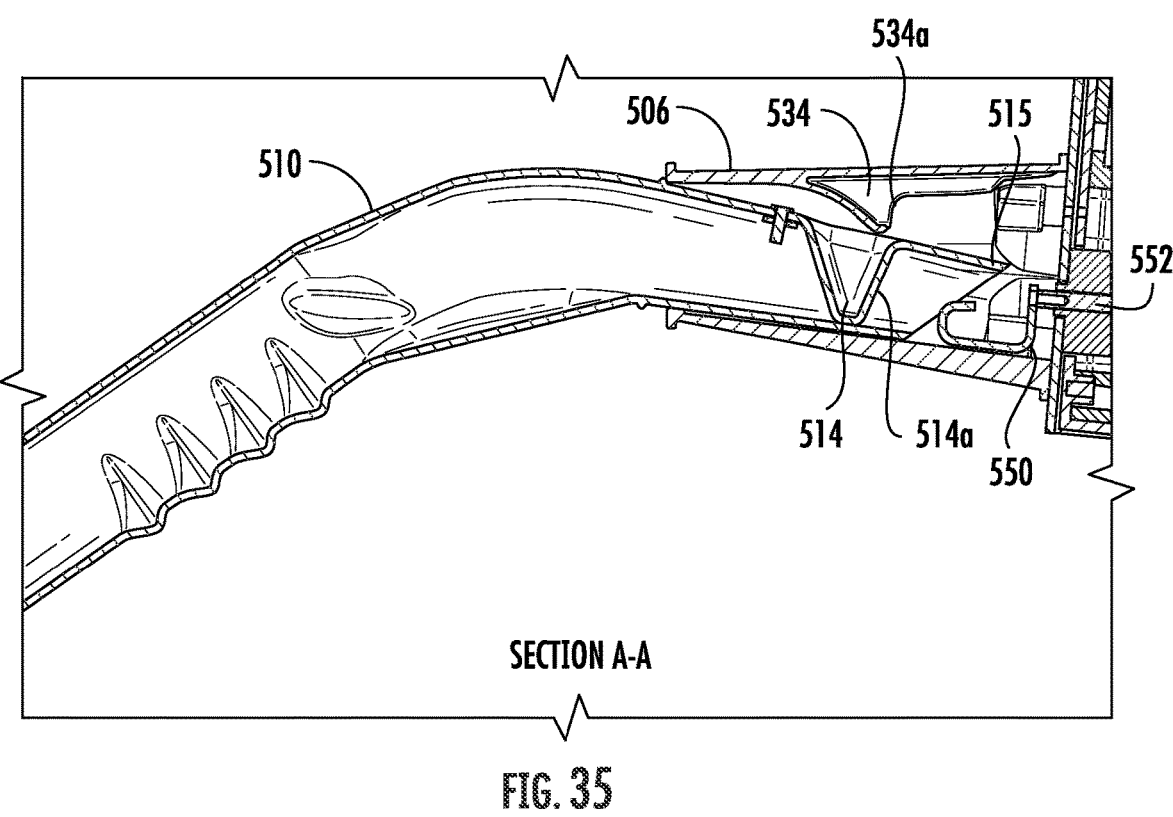
FIG. 35 is a cross-section A-A as shown in FIG. 27 of a vehicle vacuuming system holder assembly according to another aspect of the present disclosure showing the lock tooth and locking indentation interface with the lock pawl in a free position and the nose of the vacuum tool rotated downwardly.
Figure 36:
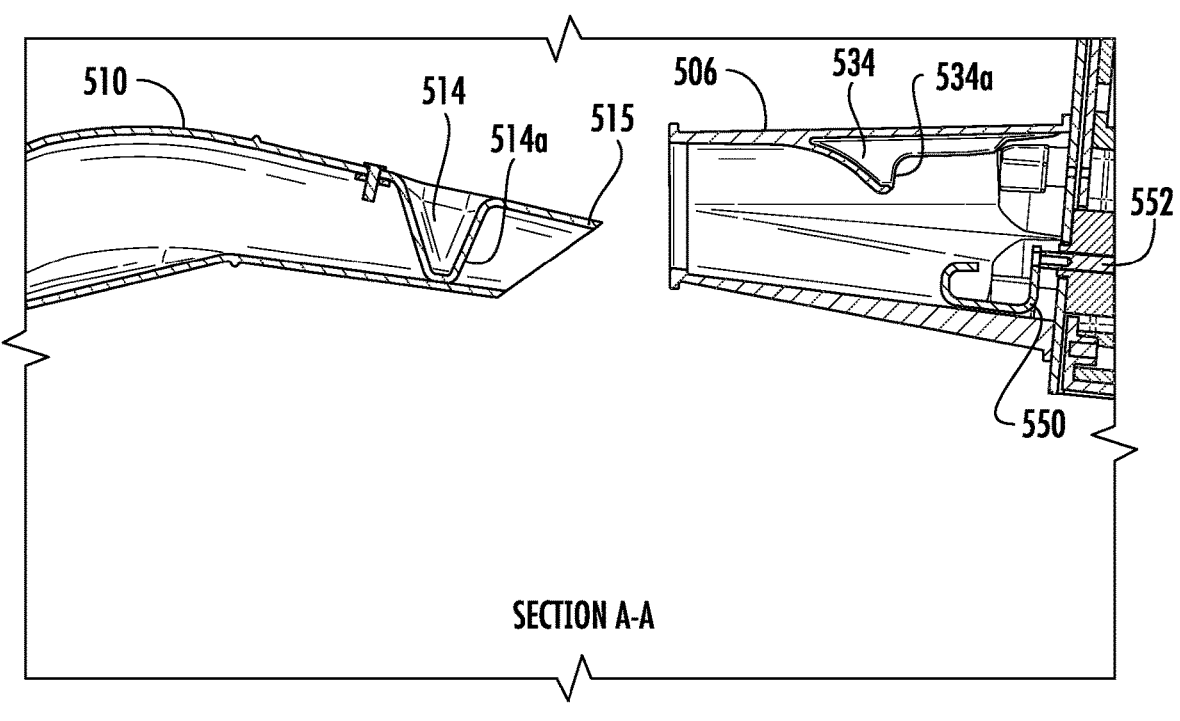
FIG. 36 is a cross-section A-A as shown in FIG. 27 of a vehicle vacuuming system holder assembly according to another aspect of the present disclosure showing the lock tooth and locking indentation interface with the lock pawl in the free position and the vacuum tool removed to use by a user.

Upon payment or another unlocking event, the solenoid is energized and the plunger 552 and pawl 550 are pulled away from the nose 515 of the tool 510. A notification may be sent to the user via the mobile device or by an indicator on the lower support 116 to notify the user that the pawl is no longer locking the vacuum tool 510 in place, and may be removed as shown in FIG. 34. At that point, as shown in FIG. 35, the nose 515 of the tool 510 may be rotated out of engagement with the lock tooth 534 and removed from the holder 506 as shown in FIG. 36. It should be known to one of ordinary skill in the art that the lock pawl could take any shape and could be any suitable material to provide enough support underneath the vacuum tool 510 in the deenergized and locked position such that a user could not remove the vacuum tool 510 using normal user forces.

The second difference between the embodiments of FIGS. 27-32 and that of FIGS. 33-36 is that the vacuum tool holder 506 may include the lock tooth 534 without needing a second tool locker 530. In this embodiment, the tooth 534 may be integrally formed with the vacuum tool holder 506 by e.g., using a single injection mold. using a post process to physically attach the tooth 534 to the vacuum tool holder 506, or any other method of integrating the tooth 534 with the vacuum tool holder 506.

It will be understood by one having ordinary skill in the art that construction of the claimed invention and other components described in the present disclosure is not limited to any specific material. Other exemplary embodiments of the claimed invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable by hand and without the use of tools in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle vacuuming system for a vehicle vacuum tool comprising:

a lower support having a vacuum housing attached thereto, the vacuum housing having a vacuum hose extending therefrom;

a vacuum tool holder coupled to the lower support and having a holding aperture on an end opposite the lower support leading to an interior volume with an upper portion and a lower portion and a lock tooth extending downwardly from the upper portion of the interior volume;

a vacuum tool disposed on an end of the vacuum hose distal from the vacuum housing, the vacuum tool comprising a nose end and a hose end that is attached to the vacuum hose, and a tooth indentation disposed on a top portion of the nose end;

a locking pawl slidably disposed on the lower portion of the vacuum tool holder opposite from the lock tooth having a locked position and a free position, wherein the locking pawl is coupled to a solenoid connected to a digital payment system and wherein the locking pawl is moved between the locked position and the free position when the solenoid is energized and deenergized;

wherein the lock tooth and the tooth indentation interface such that the vacuum tool cannot slide out of the vacuum tool holder by gravity alone; and wherein the lower portion of the vacuum tool holder is configured to allow the vacuum tool to rotate downwardly such that the tooth indentation is removed from interfacing with the lock tooth such that the vacuum tool is removable from the vacuum tool holder.

2. The vehicle vacuuming system of claim 1, wherein the vacuum tool further comprises a sealing flange around an exterior surface of the vacuum tool proximal the tooth indentation on the opposite side of the tooth indentation from the nose end, wherein the sealing flange is configured to seal against a corresponding holder sealing flange disposed about the holding aperture.

3. The vehicle vacuuming system of claim 2, wherein when in the locked position, the locking pawl is disposed between the vacuum tool and the lower portion of the vacuum tool holder and prevents the vacuum tool from rotating the tooth indentation out of contact with the lock tooth.

4. The vehicle vacuuming system of claim 3, wherein when in the free position, the locking pawl is out of contact with the vacuum tool such that the tooth indentation is free to rotate out of contact with the lock tooth.

5. The vehicle vacuuming system of claim 4 wherein the locking pawl is in the locked position when the solenoid is deenergized and in the free position when the solenoid is energized.

6. The vehicle vacuuming system of claim 5, wherein the solenoid is electrically connected to the digital payment system that receives funding from a user prior to the locking pawl being moved to the free position.

7. The vehicle vacuuming system of claim 6, wherein a user energizes the solenoid by wirelessly connecting to the digital payment system and making a payment using the digital payment system.

8. The vehicle vacuuming system of claim 1, wherein the lock tooth is disposed on a tool locker.

9. The vehicle vacuuming system of claim 8, wherein the tool locker is slidably disposed on the top portion of the vacuum tool holder.

10. A vehicle vacuuming tool/hose locking mechanism comprising:

a housing having an interior surface and interior volume within the housing sized to receive at least a portion of a vacuum tool within the interior volume of the housing;

a locking mechanism within the housing, the locking mechanism comprising:

an electrical solenoid operably connected to a piston such that, when energized, the electrical solenoid moves the piston from an extended position to a retracted position;

a locking pawl slidably disposed on the interior surface of the housing opposite from a lock tooth and wherein the locking pawl is coupled to the piston having an engaging projection that is configured to positively lock the vacuum tool or a hose when in the extended position and allow release of the vacuum tool or the hose when in the retracted position;

wherein the electrical solenoid is connected to a digital payment system that unlocks the vacuum tool or the hose when instruction to do so is provided from the digital payment system and the instruction is received by the locking mechanism;

wherein the lock tooth and a tooth indentation of the vacuum tool interface such that the vacuum tool cannot slide out of a vacuum tool holder by gravity alone; and wherein a lower portion of the vacuum tool holder is configured to allow the vacuum tool to rotate downwardly such that the tooth indentation is removed from interfacing with the lock tooth such that the vacuum tool is removable from the vacuum tool holder.

11. The vehicle vacuuming tool/hose locking mechanism of claim 10, wherein the electrical solenoid is activated to move the piston from a locked position to an unlocked position when payment is received by the digital payment system.

12. The vehicle vacuuming tool/hose locking mechanism of claim 11, wherein the vehicle vacuuming tool/hose locking mechanism is configured such that a user energizes the electrical solenoid by wirelessly connecting to the digital payment system.

13. The vehicle vacuuming tool/hose locking mechanism of claim 10, wherein the housing further comprises a holding aperture on an end opposite a lower support leading to the interior volume with an interior volume upper portion and an interior volume lower portion and the lock tooth extending downwardly from the interior volume upper portion of the interior volume of the housing.

14. The vehicle vacuuming tool/hose locking mechanism of claim 13, wherein the vacuum tool comprises a nose end and a hose end that is attached to the hose, and the tooth indentation is disposed on a top portion of the nose end.

15. The vehicle vacuuming tool/hose locking mechanism of claim 14, wherein the lock tooth and the tooth indentation interface such that the vacuum tool cannot slide out of the housing by gravity alone, and wherein the lower portion of the housing is configured to allow the vacuum tool to rotate downwardly such that the tooth indentation is removed from interfacing with the lock tooth such that the vacuum tool is removable from the housing.

16. The vehicle vacuuming tool/hose locking mechanism of claim 15, wherein when in the extended position, the locking pawl is disposed between the vacuum tool and the lower portion of the housing and prevents the vacuum tool from rotating the tooth indentation out of contact with the lock tooth.

17. The vehicle vacuuming tool/hose locking mechanism of claim 16, wherein when in the retracted position, the locking pawl is out of contact with the vacuum tool such that the tooth indentation is free to rotate out of contact with the lock tooth.

18. The vehicle vacuuming tool/hose locking mechanism of claim 10, wherein when in the extended position, the locking pawl is disposed between the vacuum tool and an interior volume lower portion of the housing and prevents the vacuum tool from rotating the tooth indentation out of contact with the lock tooth.

19. The vehicle vacuuming tool/hose locking mechanism of claim 18, wherein the vacuum tool comprises a nose end and a hose end that is attached to the hose and the tooth indentation is disposed on a top portion of the nose end and wherein when in the retracted position, the locking pawl is out of contact with the vacuum tool such that the tooth indentation is free to rotate out of contact with the lock tooth.

20. The vehicle vacuuming tool/hose locking mechanism of claim 10, wherein a user energizes a solenoid by wirelessly connecting to the digital payment system and making a payment using the digital payment system.

* * * * *